(12) United States Patent
Cvek

(10) Patent No.: US 12,188,608 B2
(45) Date of Patent: Jan. 7, 2025

(54) INTEGRATED POWER SUPPLY SYSTEM WITH AUDIO AND ELECTRONIC COMMUNICATION AND CONNECTION CAPABILITIES

(71) Applicant: Sava Cvek, Jamaica Plain, MA (US)

(72) Inventor: Sava Cvek, Jamaica Plain, MA (US)

(*) Notice: Subject to any disclaimer, the term of this patent is extended or adjusted under 35 U.S.C. 154(b) by 579 days.

(21) Appl. No.: 17/535,320

(22) Filed: Nov. 24, 2021

(65) Prior Publication Data
US 2022/0224787 A1    Jul. 14, 2022

Related U.S. Application Data

(60) Provisional application No. 63/117,706, filed on Nov. 24, 2020.

(51) Int. Cl.
| | | |
|---|---|---|
| *F16N 13/02* | (2006.01) | |
| *F16M 13/02* | (2006.01) | |
| *H01R 25/00* | (2006.01) | |
| *H01R 27/02* | (2006.01) | |
| *H01R 31/02* | (2006.01) | |
| *H01R 31/06* | (2006.01) | |
| *H01R 33/92* | (2006.01) | |

(52) U.S. Cl.
CPC .......... *F16M 13/02* (2013.01); *H01R 25/003* (2013.01); *H01R 27/02* (2013.01); *H01R 31/02* (2013.01); *H01R 31/06* (2013.01); *H01R 33/92* (2013.01); *H04R 2420/07* (2013.01); *H04R 2420/09* (2013.01)

(58) Field of Classification Search
None
See application file for complete search history.

(56) References Cited

U.S. PATENT DOCUMENTS

| | | |
|---|---|---|
| 5,231,562 A | 7/1993 | Pierce et al. |
| 5,971,508 A | 10/1999 | Deimen et al. |
| 6,254,206 B1 | 7/2001 | Petrick et al. |

(Continued)

FOREIGN PATENT DOCUMENTS

| | | |
|---|---|---|
| AU | 2011201001 B2 | 9/2011 |
| DE | 102012100219 | 1/2013 |

*Primary Examiner* — Ross N Gushi
(74) *Attorney, Agent, or Firm* — Thomas P. O'Connell; O'Connell Law Firm

(57) ABSTRACT

An integrated power supply system with audio and electronic communication and connection capabilities for being retained relative to a work surface. The system has a system base, power outlets, electronic data connectivity ports, and speakers. The connectivity ports can comprise USB, USB-C, LAN, HDMI, telephonic, or other ports. A telephone connectivity subsystem enables telephone communication, and a wireless connectivity subsystem enables wireless operation. A central engaging portion of the system base is received into positive engagement in a selective position along a mounting collar and within an aperture in the work surface, and a mounting bracket clamps the work surface between the system base and the mounting bracket. A detachable electronic command console is operative to control electronic operation of the system base and electronics coupled to the system base. The command console is further operative to permit control and operation of the telephone connectivity subsystem.

28 Claims, 24 Drawing Sheets

(56) References Cited

U.S. PATENT DOCUMENTS

| | | | |
|---|---|---|---|
| 6,410,855 B1 | 6/2002 | Berkowitz et al. | |
| 6,448,498 B1 | 9/2002 | King et al. | |
| 6,903,266 B1 | 6/2005 | Luciere | |
| D676,418 S | 2/2013 | Suzuki | |
| 8,480,429 B2 * | 7/2013 | Byrne | H02G 3/0437 |
| | | | 439/574 |
| D726,155 S | 4/2015 | Cheng et al. | |
| 9,148,006 B2 * | 9/2015 | Byrne | H02G 3/18 |
| 9,312,673 B2 * | 4/2016 | Byrne | H02G 3/12 |
| 9,385,489 B2 | 7/2016 | Wang | |
| 9,490,664 B2 | 11/2016 | Lo et al. | |
| 9,496,691 B2 | 11/2016 | Westrick, Jr. et al. | |
| 10,008,816 B2 * | 6/2018 | Byrne | H04M 1/62 |
| 10,175,996 B2 * | 1/2019 | Byrne | H01R 24/76 |
| 10,211,584 B2 | 2/2019 | Smed | |
| 10,340,645 B2 * | 7/2019 | Wu | H02J 7/0044 |
| 10,575,632 B2 | 3/2020 | Yoo et al. | |
| 10,621,113 B2 * | 4/2020 | Byrne | H01R 24/78 |
| 2011/0036276 A1 | 2/2011 | Petrick et al. | |
| 2014/0312691 A1 | 10/2014 | Doljack et al. | |
| 2015/0195635 A1 | 7/2015 | Garfio et al. | |
| 2015/0282612 A1 | 10/2015 | Rutz | |
| 2017/0054323 A1 | 2/2017 | Lo et al. | |
| 2020/0388972 A1 * | 12/2020 | Byrne | H01R 31/06 |

\* cited by examiner

INTEGRATED POWER SUPPLY SYSTEM WITH AUDIO AND ELECTRONIC COMMUNICATION AND CONNECTION CAPABILITIES

RELATED APPLICATION

This application claims priority to Provisional Application No. 63/117,706, filed Nov. 24, 2020, the entirety of which being incorporated herein by reference.

FIELD OF THE INVENTION

The present invention relates generally to electronic power and communication. More particularly, disclosed herein is an integrated power supply system with audio and electronic communication and connection capabilities for permitting effective communication and electronic connection in office, academic, and home environments.

BACKGROUND OF THE INVENTION

Power and communication capabilities are an integral part of modern office and academic settings. In any given situation involving individuals seeking to make use of electronic devices, such as computer tablets and laptops and mobile telephones, there are inherent needs for the supply of power, for video and audio communication capabilities, and for data connectivity.

Remote conferencing, which typically requires both audio and video communication, has become increasingly common. Disadvantageously, however, the ability of individuals, particularly groups of individuals, to access and be provided with sufficient power, data, and communication capabilities is severely limited and compromised under current practices. For instance, it is not uncommon for multiple persons in an office or personal environment to be forced to huddle around and strain to hear the relatively ineffective audio eked out by one individual's mobile telephone or laptop computer. Meanwhile, individuals in office, academic, and home environments commonly find themselves searching for power and data outlets and spreading and stringing electronic wiring and electronic devices over the work surface in a complicated and inefficient manner.

In view of the limitations and difficulties presented by current methods and systems for providing power, data, and communication in office, academic, and home environments, it is apparent to the present inventor that an integrated power supply with audio and electronic communication and connection capabilities would represent a marked advance in the art.

SUMMARY OF THE INVENTION

The present invention is thus founded on the basic object of providing an integrated power supply with audio and electronic communication and connection capabilities.

A more particular object of embodiments of the invention is to provide an integrated power supply with audio and electronic communication and connection capabilities that can be mounted in relation to a work surface, such as a table or desk, to permit convenient, enhanced access to electrical power and audio and electronic communications and connections in office, academic, and home environments.

These and in all likelihood further objects and advantages of the present invention will become obvious not only to one who reviews the present specification and drawings but also to those who have an opportunity to make use of an embodiment of the integrated power supply with audio and electronic communication and connection capabilities disclosed herein. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

An embodiment of the integrated power supply with audio and electronic communication and connection capabilities is founded on a system base for being retained by a work surface. At least one power outlet is retained by the system base. The system base also retains at least one electronic data connectivity port and at least one speaker.

In embodiments disclosed herein, for instance, the system base has a central portion and first and second end portions. A first speaker is built into the first end portion of the system base, and a second speaker is built into the second end portion of the system base. The electronic data connectivity ports can vary within the scope of the invention, such as to include one or more universal serial bus (USB) ports, one or more universal serial bus type C (USB-C) ports, one or more local area network (LAN) ports, one or more high-definition multimedia interface (HDMI) ports, and, additionally or alternatively, one or more other electronic data connectivity ports as may now exist or hereafter be developed.

In certain practices of the invention, the system base can further include an electronic telephone connectivity subsystem with electronic telephone circuitry, a telephone control interface, and a microphone interface. Still further, the system base can further comprise a wireless connectivity subsystem to permit wireless communication to and from the system base in relation to external electronic devices, such as laptop and tablet computers, telephones, and other electronic devices.

According to manifestations of the integrated power supply system, the system base can have a main body portion with an upper surface and a lower surface. A central engaging portion can project distally from the lower surface of the main body portion of the system base for being received into positive engagement with an aperture in the work surface.

A mounting bracket can retain the system base in relation to an aperture in the work surface. For example, the mounting bracket can be adapted to be disposed to an underside of the work surface to be secured to the system base thereby to secure the work surface between the system base and the mounting bracket. Still more particularly, the mounting bracket can have an opening sized and shaped to receive the central engaging portion of the system base. Further, the mounting bracket can have inwardly-extending projections for receiving fasteners therethrough and into the system base and outwardly extending projections for receiving fasteners therethrough and into the work surface.

In practices of the invention, a mounting collar can be provided for lining the aperture in the work surface. The mounting collar has an opening with a width and a length, and the mounting bracket has a width sized to be received into the mounting collar. The system base can be considered to have a longitudinal length while the mounting collar has a longitudinal opening with a length. The length of the longitudinal opening of the mounting collar can then be greater than the longitudinal length of the system base such that the system base can be selectively positioned within the mounting collar.

Also as disclosed herein, the system base can have an option window in the upper surface of the system base and an option bay in the lower surface of the system base. The option window and the option bay can be selectively employed to retain corresponding electronic data connectivity ports. The option window and the option bay can be selectively removable and replaceable in relation to the system base to enable an adaptation of the connectivity ports provided by the integrated power supply system.

Embodiments of the integrated power supply system further incorporate an electronic command console operative to control electronic operation of the system base. The command console is detachable from the system base. The command console retains electronic memory and has an electronic display screen. Wirelessly connectivity of the command console to the system base enables the command console to be operative as a handheld, portable control unit to provide wireless control over operation of the system base. Also as disclosed herein, the command console is operative to provide wireless control over the operation of electronic devices connected to the system base by wire or wirelessly, including laptop and tablet computers, telephones, and other electronic devices. The system base can include a reception bay for receiving and selectively retaining the command console. Electrical contacts provide an electronic connection between the system base and the command console. Where the system base incorporates an electronic telephonic connectivity subsystem, the command console can be operative to provide display and operation of alphanumeric buttons as interface controls operative to permit control and operation of the electronic telephone connectivity subsystem.

One will appreciate that the foregoing discussion broadly outlines the more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

DETAILED DESCRIPTION OF PREFERRED EMBODIMENTS

The integrated power supply system with audio and electronic communication and connection capabilities disclosed herein is subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

The integrated power supply system with audio and electronic communication and connection capabilities can be employed to advantage relative to desks and other work surfaces. However, it is to be understood that the power supply with audio and electronic communication and connection capabilities could be employed in other applications within the scope of the invention except as it may be expressly limited by the claims. Before any particular embodiment of the invention is explained in detail, it must be made clear that the following details of construction and illustrations of inventive concepts are mere examples of the many possible manifestations of the invention.

Figure 1:
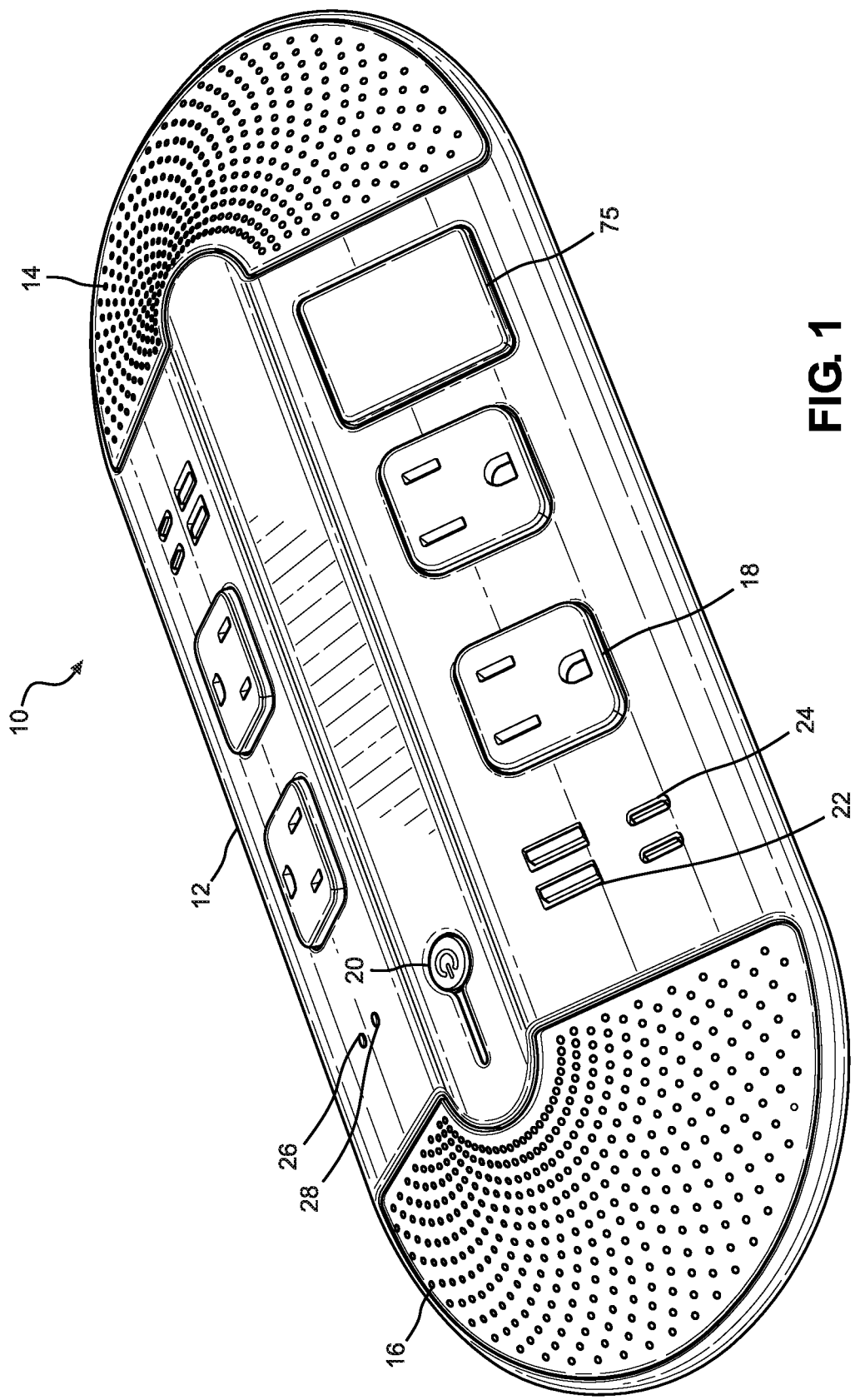
FIG. 1 is a perspective view of an integrated power supply system with audio and electronic connection capabilities as disclosed herein.
Figure 2:
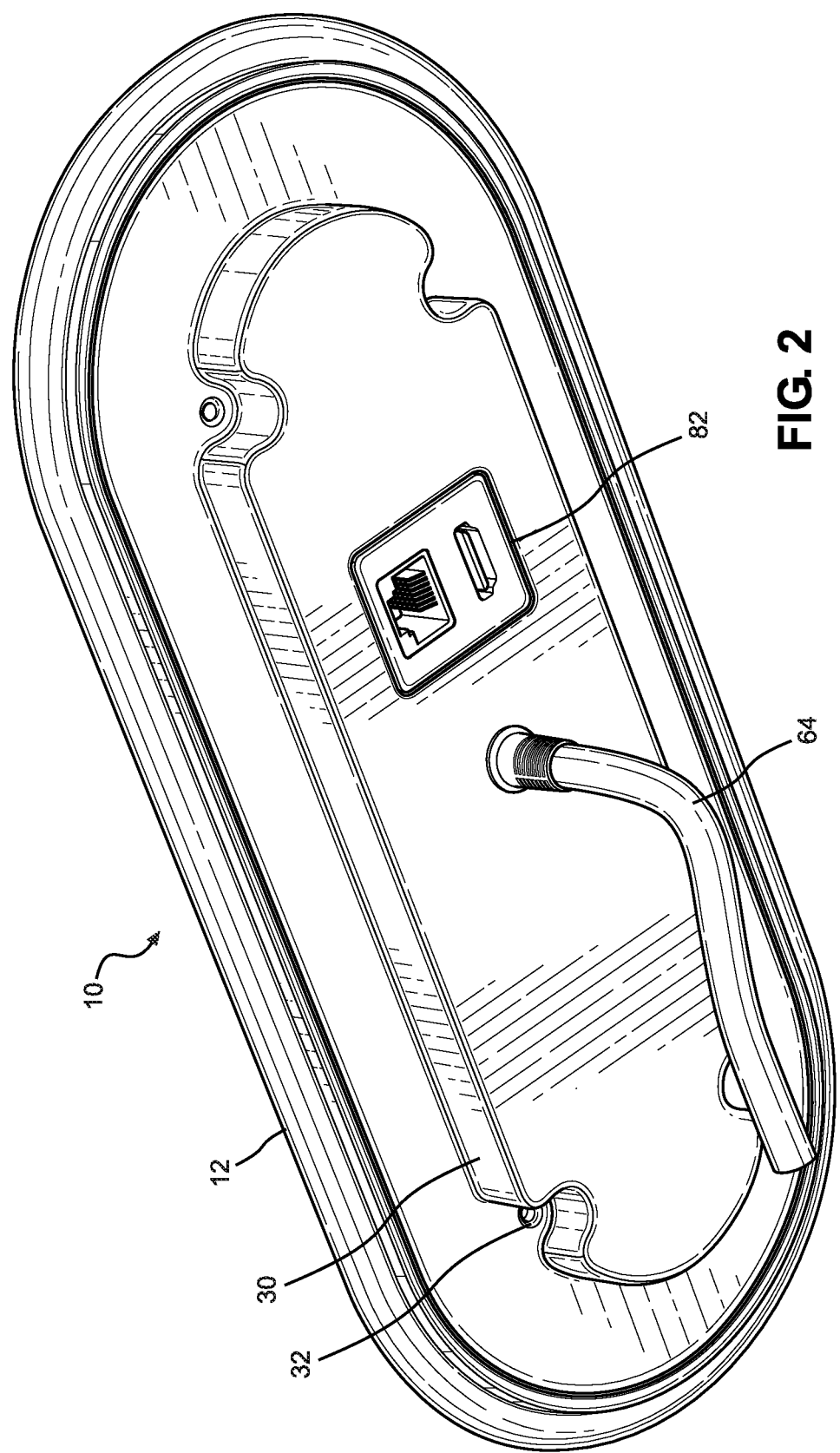
FIG. 2 is a lower perspective view of the integrated power supply system with audio and electronic connection capabilities of FIG. 1.

Turning more particularly to the drawings, an integrated power supply system with audio and electronic communication and connection capabilities according to the invention is indicated generally at 10 in FIGS. 1 and 2. There, the system 10 is founded on a base 12, which in this embodiment is oblong, with a raised, elongate central portion and first and second end portions. The base 12 tapers in height from a flat central plateau of the raised, elongate central portion toward the lateral edges of the central portion and toward the arcuate first and second end portions. A first speaker 14 has a half frusto-conical shape spanning approximately 180 degrees and is built into the first end portion of the base 12, and a second speaker having a half frusto-conical shape again spanning approximately 180 degrees is built into the second end portion of the base 12. The first and second end portions of the base 12 thus act as audio outputs for the integrated power supply system 10.

The central portion provides a plurality of electric power and electronic data connections for providing ready power and data access to surrounding users. More particularly with respect to the depicted embodiment of FIG. 1, a plurality of grounded power outlets 18, in this non-limiting example four, are retained within the central portion of the base 12 to provide accessible power supply. Further, the central portion retains plural power and data connectivity ports. In this embodiment, the power and data connectivity ports comprise first and second universal serial bus (USB) ports 22 within each sloped lateral surface of the base 12 and first and second universal serial bus Type C (USB-C) ports 24 disposed within each sloped lateral surface of the base 12 in parallel with the USB ports 22. A power button 20 is disposed within the plateau of the base 12 for selectively powering one or more aspects of the integrated power supply system 10, such as but not necessarily limited to the speakers 14 and 16 and other electrical power. A system ground indicator light 26 is provided for indicating power and grounding to the system 12, and a power surge protector indicator light 28 is provided for confirming power surge protection to the system 12 and to connected electronic components.

Figure 6:
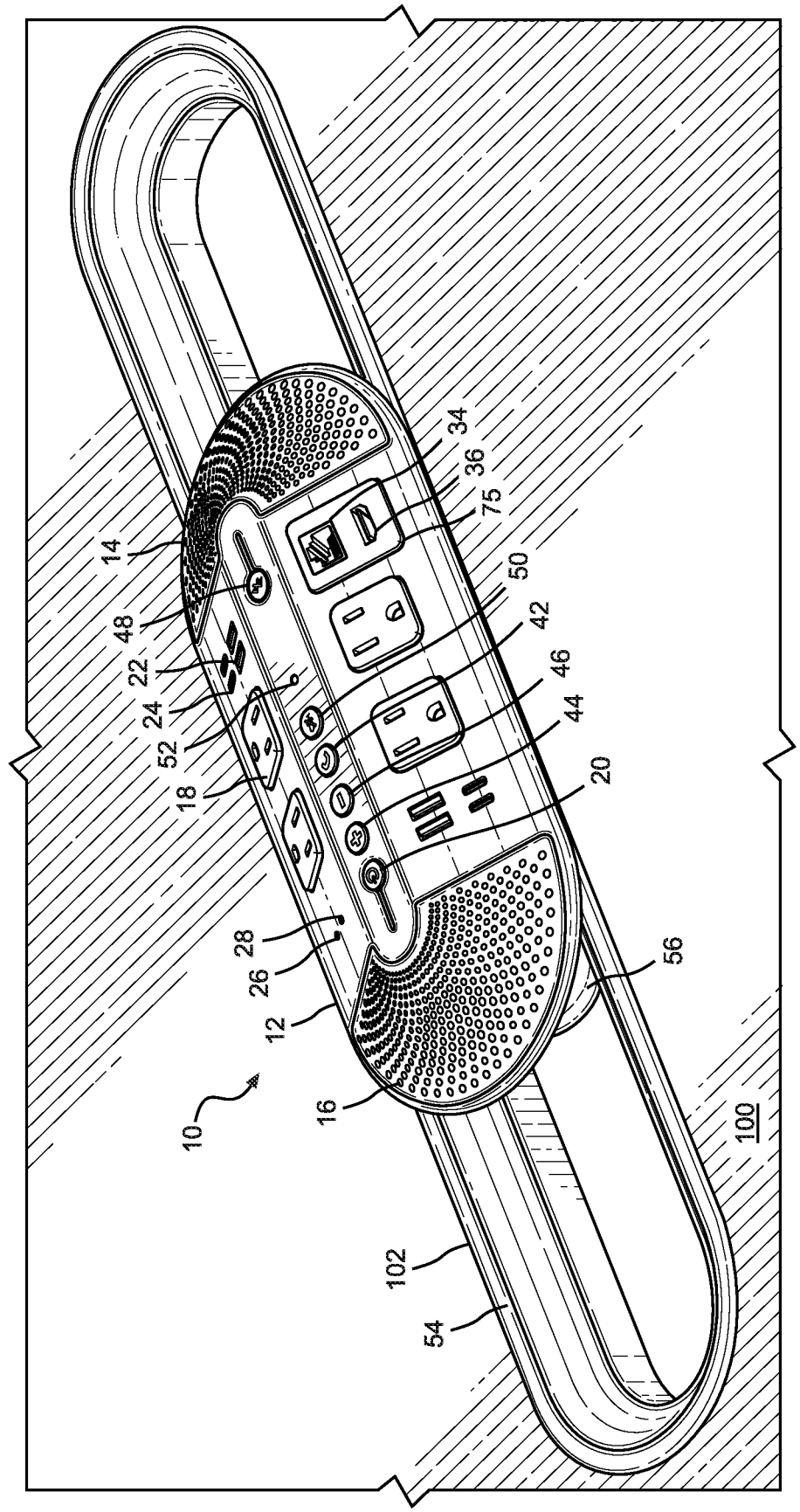
FIG. 6 is a perspective view of an integrated power supply system with audio and electronic connection capabilities mounted within a work surface.

Looking more particularly to FIG. 2, where the lower portion of the system 10 is illustrated, a central engaging portion 30 projects a given height distally from the lower surface of the base 12 for being received into and positively engaging a correspondingly shaped and sized aperture 102 in a work surface 100 as shown, for instance, in FIG. 6. As shown and described further hereinbelow, fastening apertures 32 in the base 12 permit the use of fasteners to retain the system 10 in relation to the work surface 100. In the present embodiment where the base 12 has an oblong configuration, the central engaging portion 30 similarly has an oblong peripheral shape. The central engaging portion 30 has a peripheral outer edge spaced inwardly of the peripheral outer edge of the base 12. The fastening apertures 32 are disposed within inlets in the oblong peripheral shape of the central engaging portion 30. Power and data cabling 64 extends from the lower surface of the base 12 for electrical connection to, for instance, building power supplies and external communication and other electronic connectivity.

Figure 3:
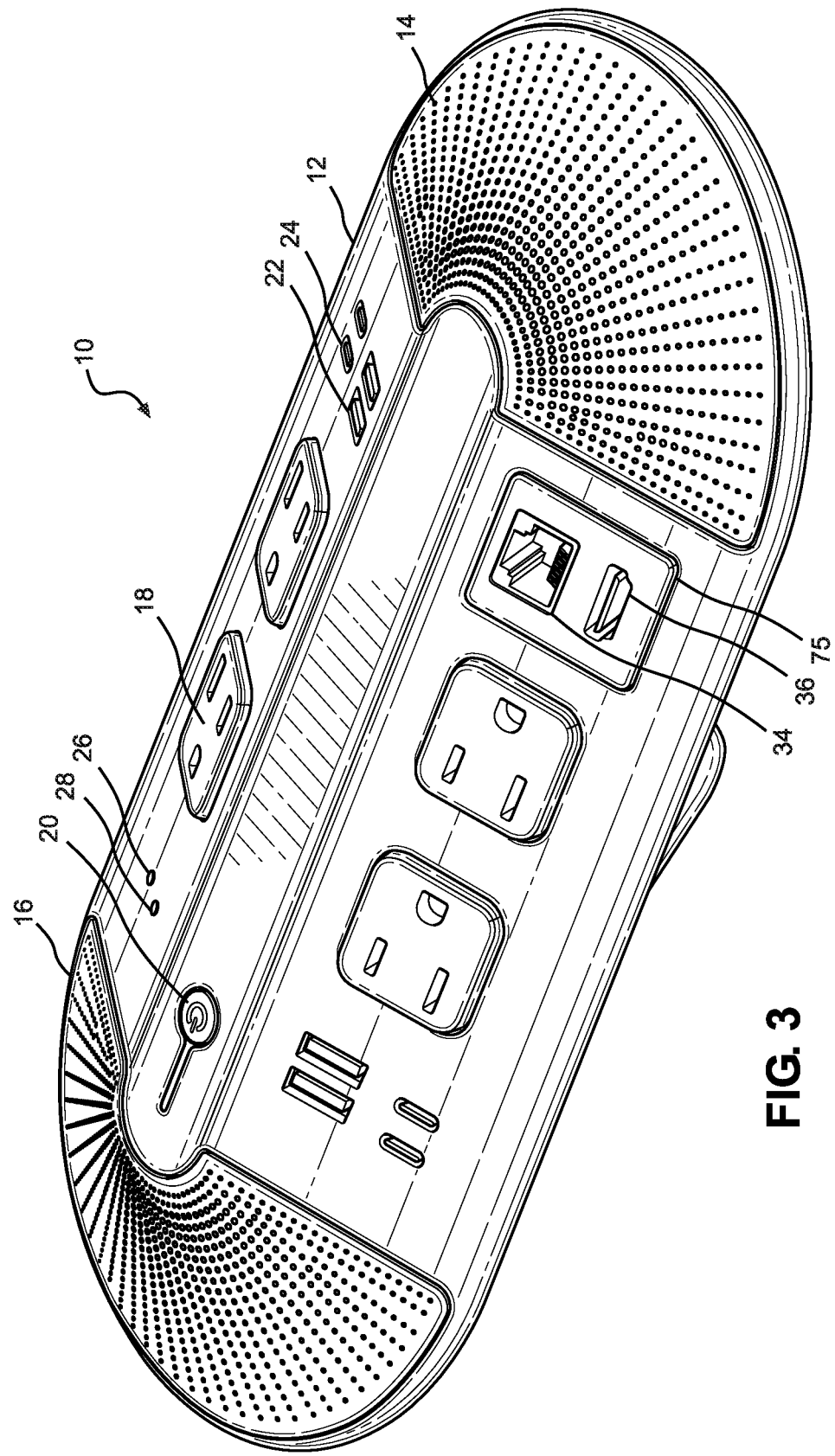
FIG. 3 is a perspective view of an alternative embodiment of the integrated power supply system with audio and electronic connection capabilities.
Figure 4:
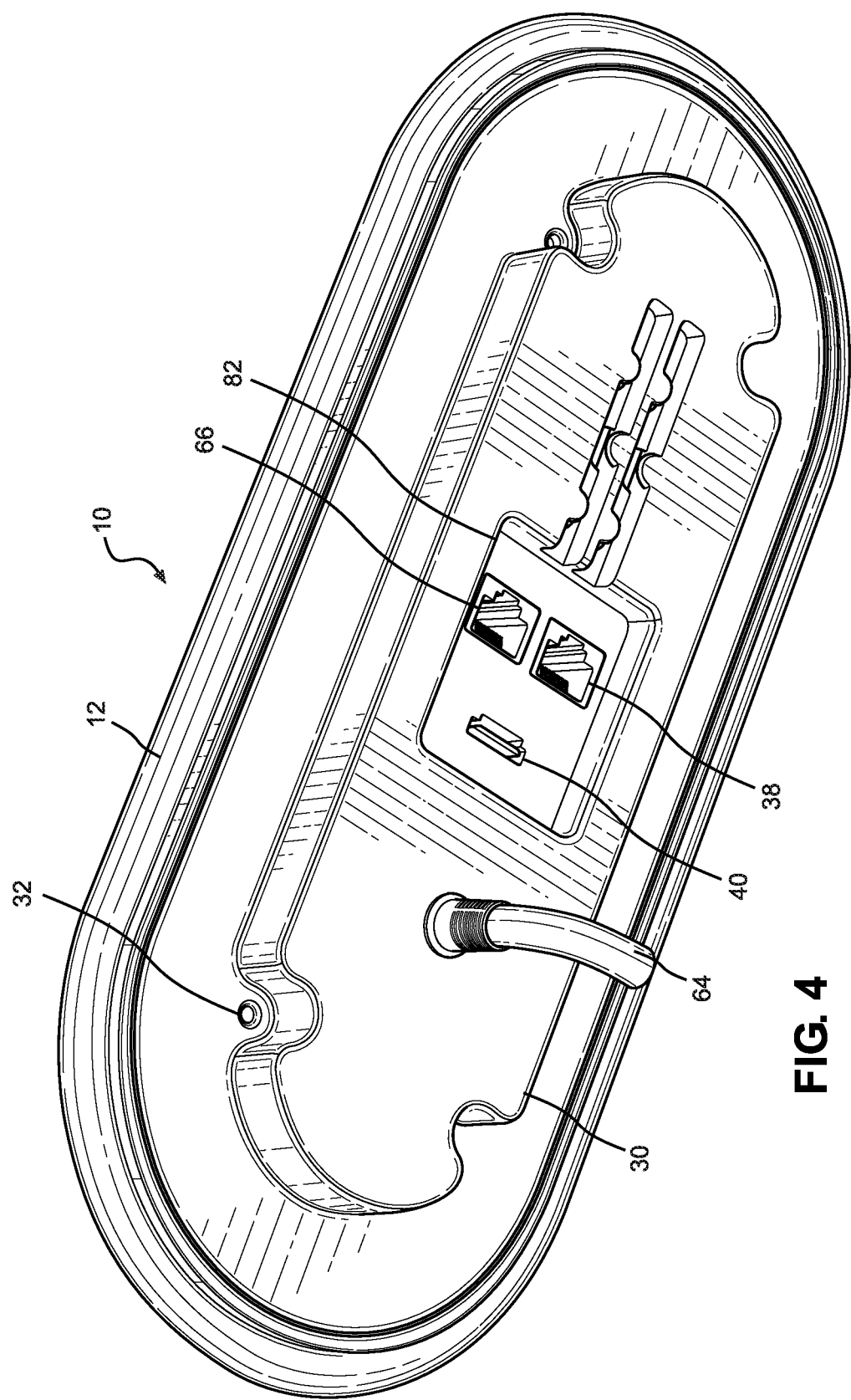
FIG. 4 is a lower perspective view of the integrated power supply system with audio and electronic connection capabilities of FIG. 3.

As shown in FIGS. 1 and 3, the base 12 incorporates what can be referred to as an option window 75 that can be selectively employed to retain connectivity ports. For instance, as in FIG. 1, the option window 75 can be provided as a blank plate without functionality. Alternatively, as in FIG. 3, for example, the option window 75 can be employed to provide connectivity ports comprising local area network (LAN) and high-definition multimedia (HDMI) ports 34 and 36. In a similar manner, as FIGS. 2 and 4 show, an option bay 82 is provided on the underside of the base 12, in this embodiment within the central engaging portion 30. The option bay 82 permits the provision of electronic connection ports corresponding to the options on the user-facing surface of the base 12. For instance, the option bay 82 can retain electronic ports, such as a local area network (LAN) port 38 and a high-definition multimedia (HDMI) port 40, for electronic connection external to the base 12. Within the scope of the invention, the option window 75 within the upper surface of the base 12 and the option bay 82 in the lower surface of the base 12 can be removable and replaceable, such as with snap-fit or fastener engagement and electronic contacts adaptable to the retained connectivity ports.

Referring to the alternative embodiment of the integrated power supply system 10 depicted in FIGS. 3 and 4, the system 10 is again founded on an oblong base 12 that has a raised, elongate central plateau portion and first and second end portions. First and second speakers 14 and 16 having half frusto-conical shapes are built into the first and second end portions of the base 12 to act as audio outputs for the integrated power supply system 10. Power and data connections are retained by the central portion of the base 12. These again include grounded power outlets 18 and power and data connectivity ports comprising universal serial bus (USB) ports 22 and universal serial bus Type C (USB-C) ports 24. Here, however, the system 10 further incorporates a local area network (LAN) port 34 and a high-definition multimedia (HDMI) port 36 within the option window 75 in the upper surface of the central portion and corresponding LAN and HDMI ports 38 and 40 within the option bay 82 in the lower surface of the base 12 for providing external connectivity. A power button 20 is disposed within the plateau of the base 12 for selectively powering one or more aspects of the integrated power supply system 10, such as but not necessarily limited to the speakers 14 and 16 and further electronic aspects of the system 10.

As shown in FIG. 4 where the lower portion of the system 10 is illustrated, the base 12 has a central engaging portion 30 that projects a given height distally from the base 12 for being received into and positively engaging a correspondingly shaped and sized aperture 102 in a work surface 100. Fastening apertures 32 in the base 12 permit the use of fasteners to retain the system 10 in relation to the work surface 100. Like the base, the central engaging portion 30 has an oblong peripheral shape, and the fastening apertures 32 are disposed within inlets in the oblong peripheral shape of the central engaging portion 30. In the present embodiment where the base 12 has an oblong configuration, the central engaging portion 30 has an oblong outer periphery corresponding to the outer peripheral shape of the base 12. Power and data cabling 64 extends from the lower surface of the base 12 for electrical connection to, for instance, building power supplies and external communication and other electronic connectivity.

Figure 5:
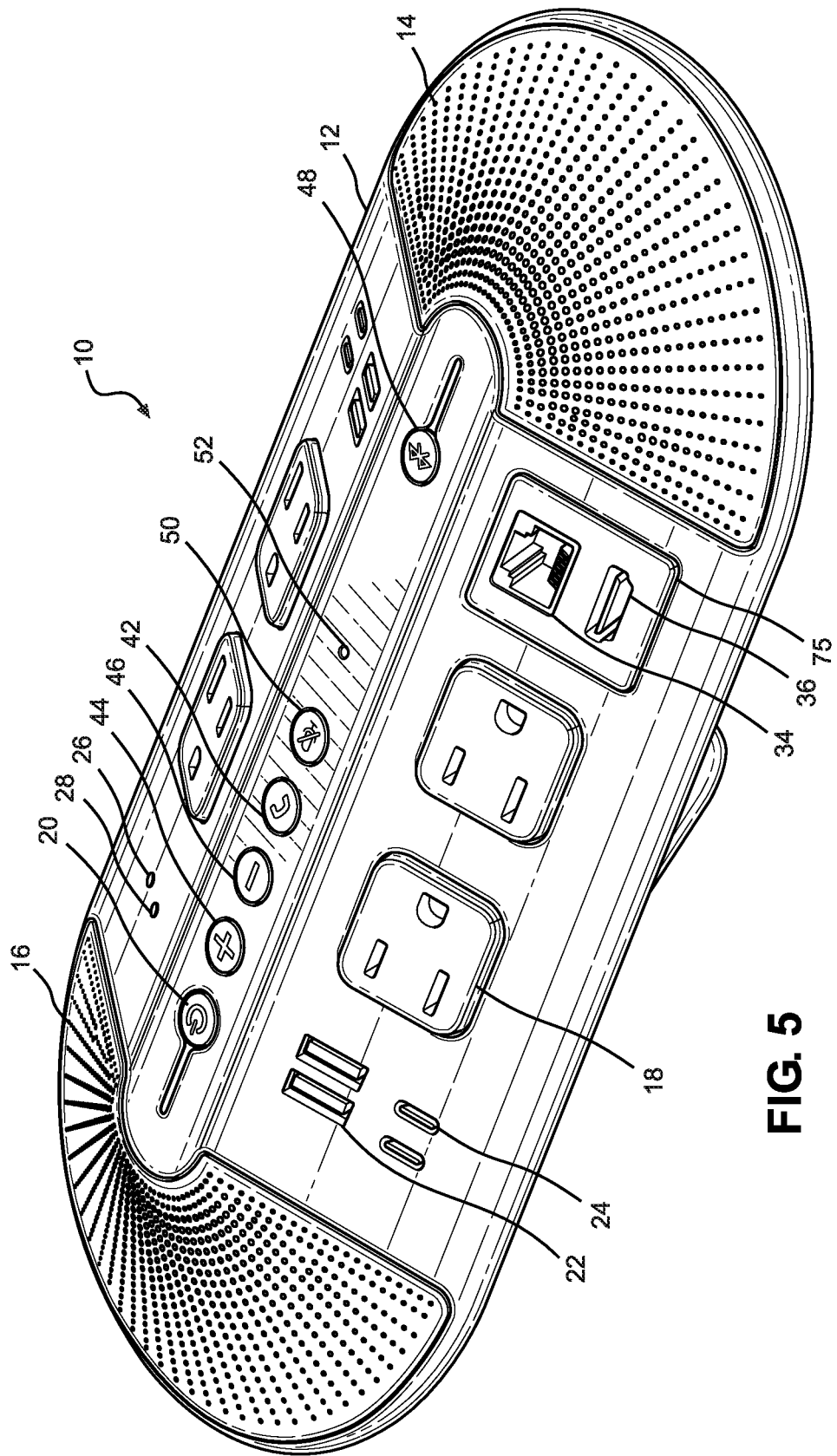
FIG. 5 is a perspective view of another alternative embodiment of the integrated power supply system with audio and electronic connection capabilities.

An integrated power supply system 10 with still further functionality is shown in FIG. 5. The system 10 has an oblong base 12 again retaining first and second half frusto-conical speakers 14. Grounded power outlets 18 and power and data connectivity ports comprising universal serial bus (USB) ports 22 and universal serial bus Type C (USB-C) ports 24 are built into the base 12 as is a local area network (LAN) port 34 and a high-definition multimedia interface (HDMI) port 36, again with corresponding LAN and HDMI ports in the lower surface of the base 12 as previously illustrated for providing external connectivity. A power button 20 again selectively enables the providing of electrical power to one or more aspects of the integrated power supply system 10, such as but not necessarily limited to the speakers 14 and 16.

The integrated power supply system 10 of FIG. 5 further provides telephonic and wireless connectivity, such as through the short range wireless connectivity technology operated under the registered trademark BLUETOOTH. A wireless connectivity button 48 is disposed within the plateau of the central portion as is a telephone connection button 42, a telephone disconnection or muting button 50, and volume increase and decrease buttons 44 and 46. The base 12 additionally retains a microphone port 52. Corresponding circuitry for each of the described components is housed within the base 12.

According to the practices of the invention, the integrated power supply system 10 could be used independently without mounting to any particular support structure to provide electrical power and audio and electronic communications and connections in office, academic, and home environments. In other practices of the invention, the integrated power supply system 10 can be mounted in relation to a support structure, such as a work surface 100. For instance, the system 10 can be retained in a corresponding aperture 102 in a work surface 100 as in FIG. 6. The work surface 100 could, by way of example and not limitation, comprise a conference table, a desk, or any other work surface 100.

With added reference to FIGS. 8, 9, and 20 through 24, a mounting bracket 56 is provided for selectively fixing the base 12 in place in relation to a work surface 100. Here, the bracket 56 is received from an underside of the work surface 100 to be matingly engaged with the aperture 102 in the work surface 100 and the mounting collar 54 and the central engaging portion 30 in the base 12. The bracket 56 is operative effectively to clamp the work surface 100 between the base 12 to the upper side of the work surface 100 and the bracket 56 to the lower side of the work surface 100. As illustrated, the bracket 56 has a wall sized and shaped to closely receive the central engaging portion 30 of the base 12. For instance, where the central engaging portion 30 is oblong as in the present embodiment, the bracket 56 can have a wall defining an oblong aperture sized and shaped to receive the central engaging portion 30 of the base 12 closely. The bracket 56 is also sized and shaped with a width to be closely received into the mounting collar 54 but with a length less than the length of the opening in the mounting collar 54 and the length of the aperture 102 in the work surface 100 so that the base 12 and the bracket 56 fixed relative thereto can be selectively positioned along the mounting collar 54 and the aperture 102 and then fastened in place.

Figure 8:
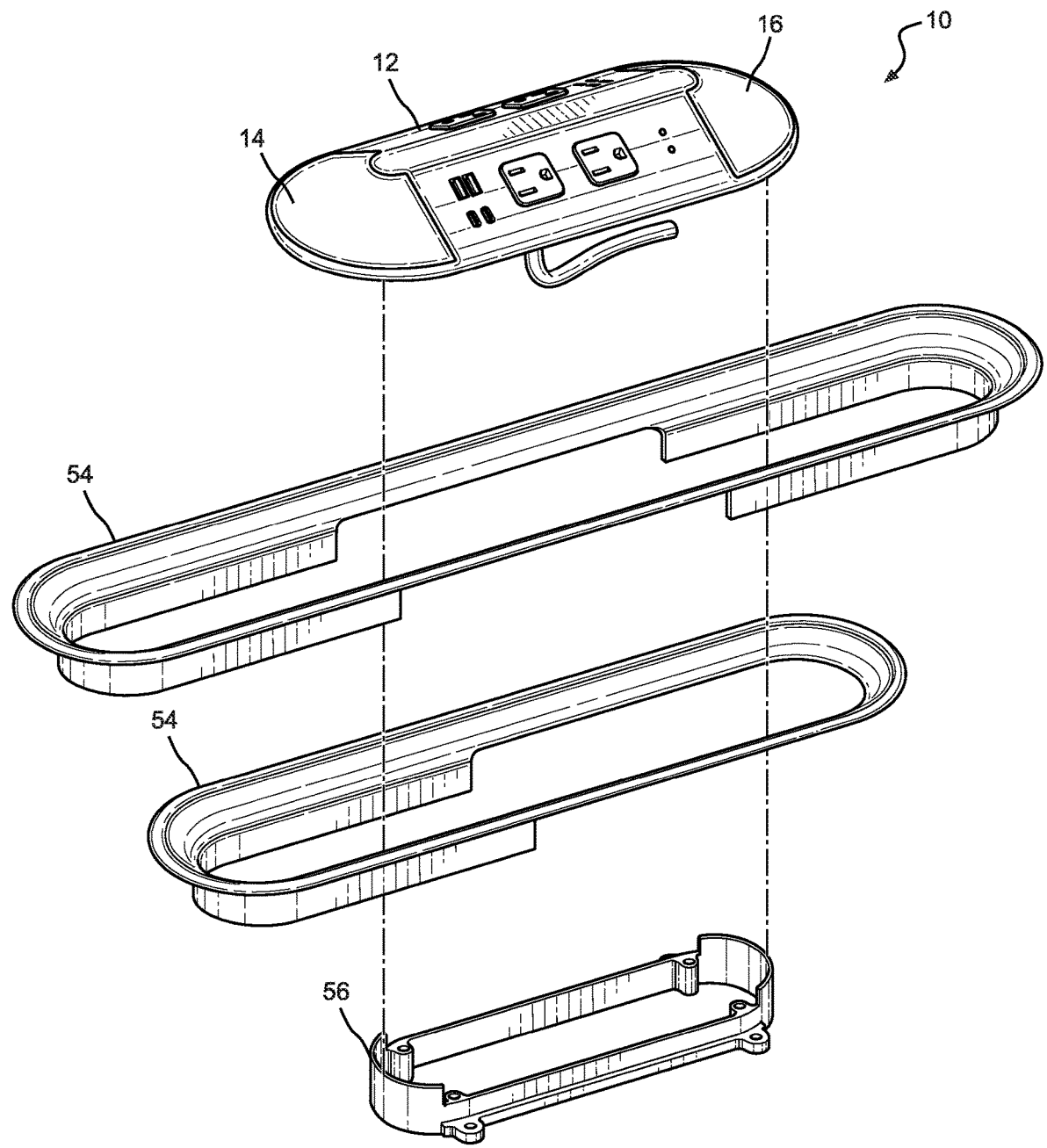
FIG. 8 is an exploded perspective view of an integrated power supply system with audio and electronic connection capabilities with a mounting structure.
Figure 9:
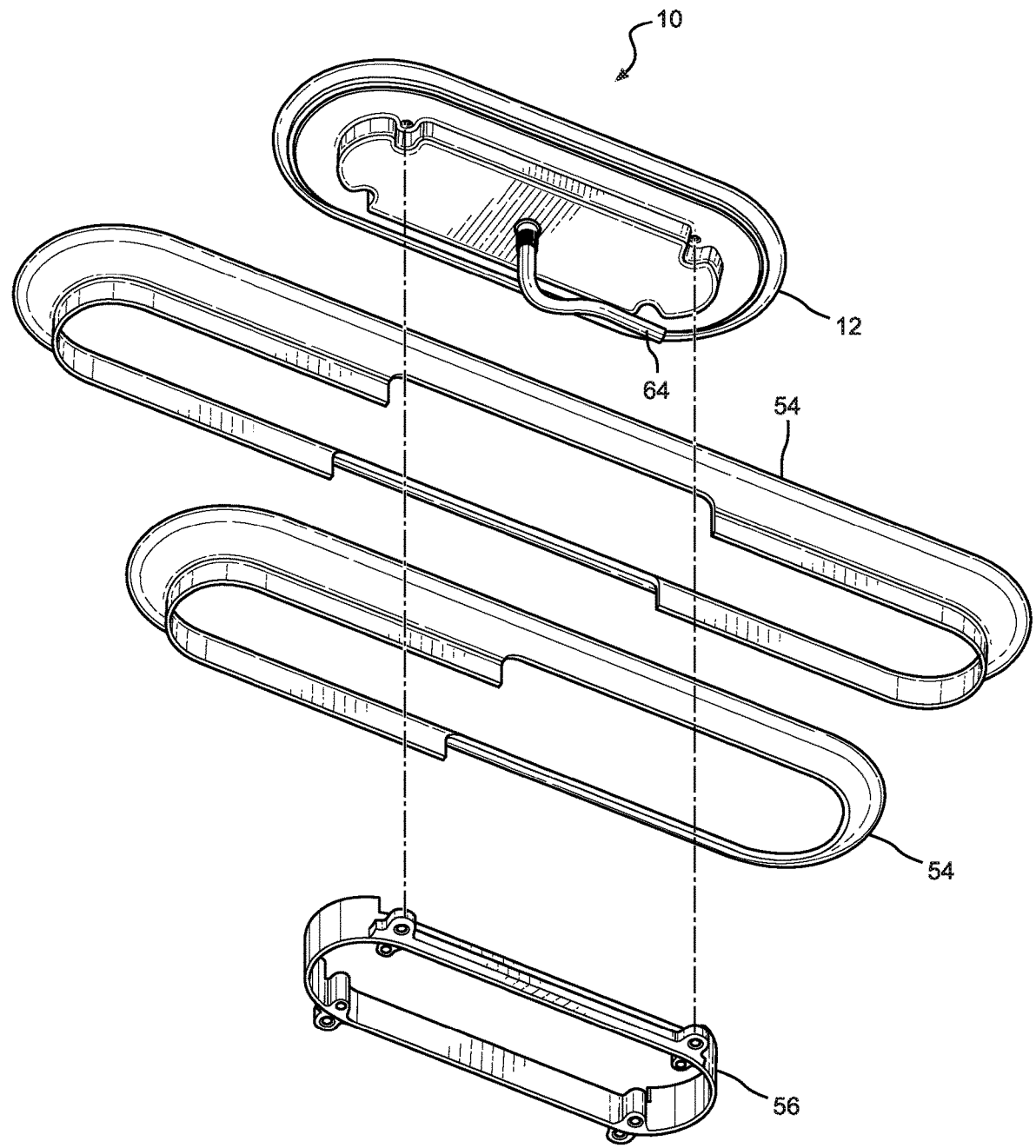
FIG. 9 is an exploded lower perspective view of the integrated power supply system with audio and electronic connection capabilities with the mounting structure of FIG. 8.
Figure 10:
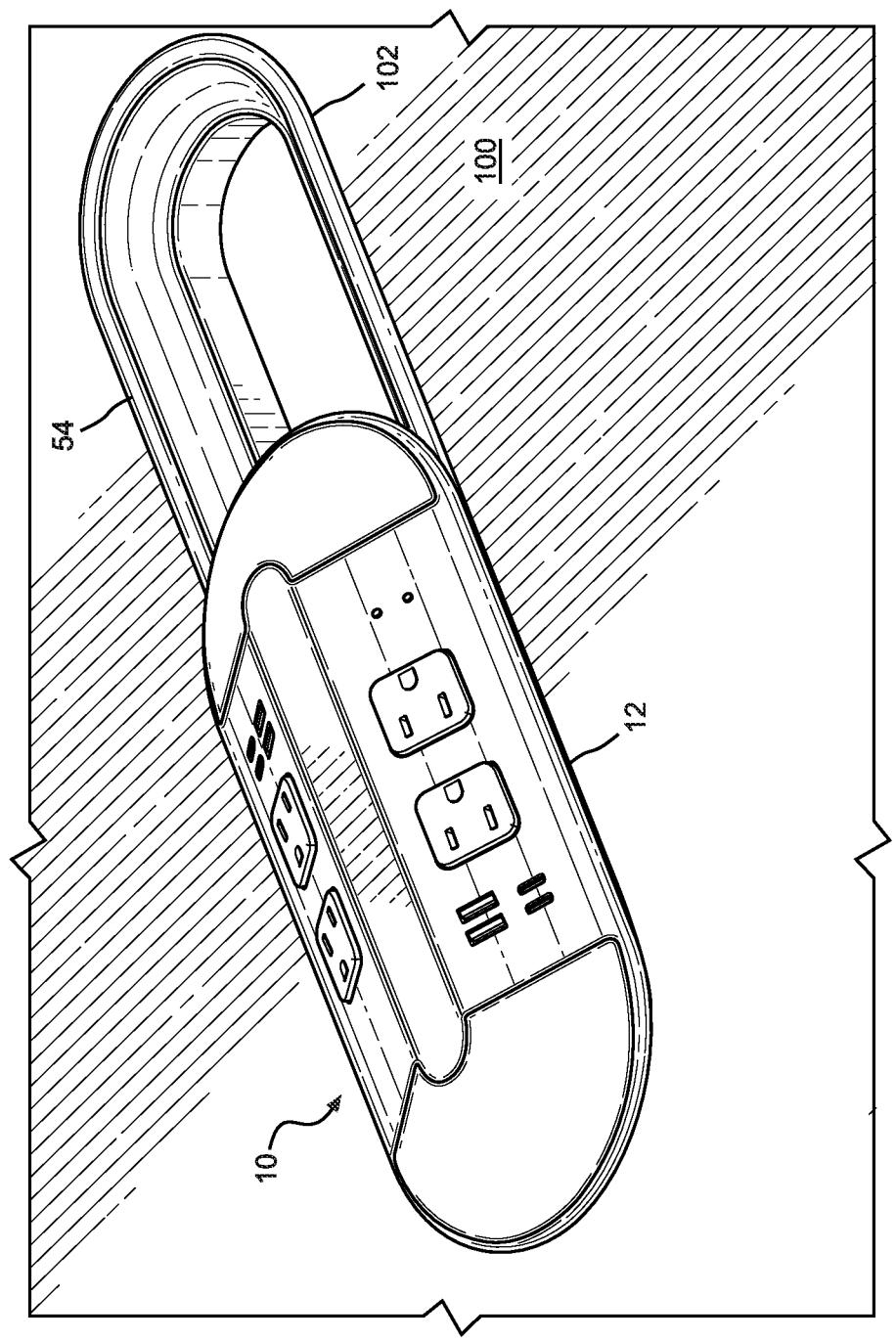
FIG. 10 is a perspective view of an integrated power supply system with audio and electronic connection capabilities mounted within a work surface.
Figure 11:
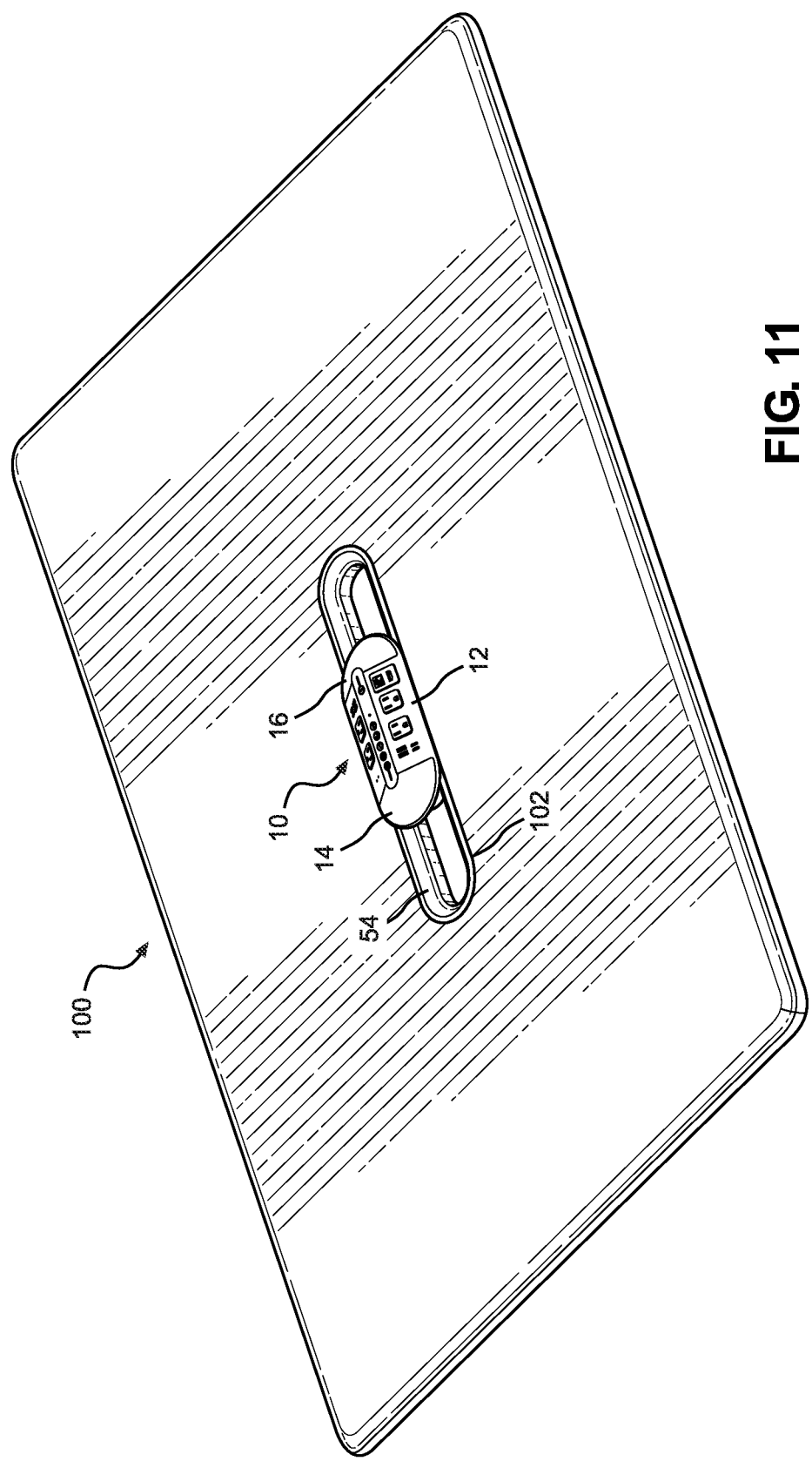
FIG. 11 is a perspective plan view of the integrated power supply system with audio and electronic connection capabilities mounted within a work surface.
Figure 22:
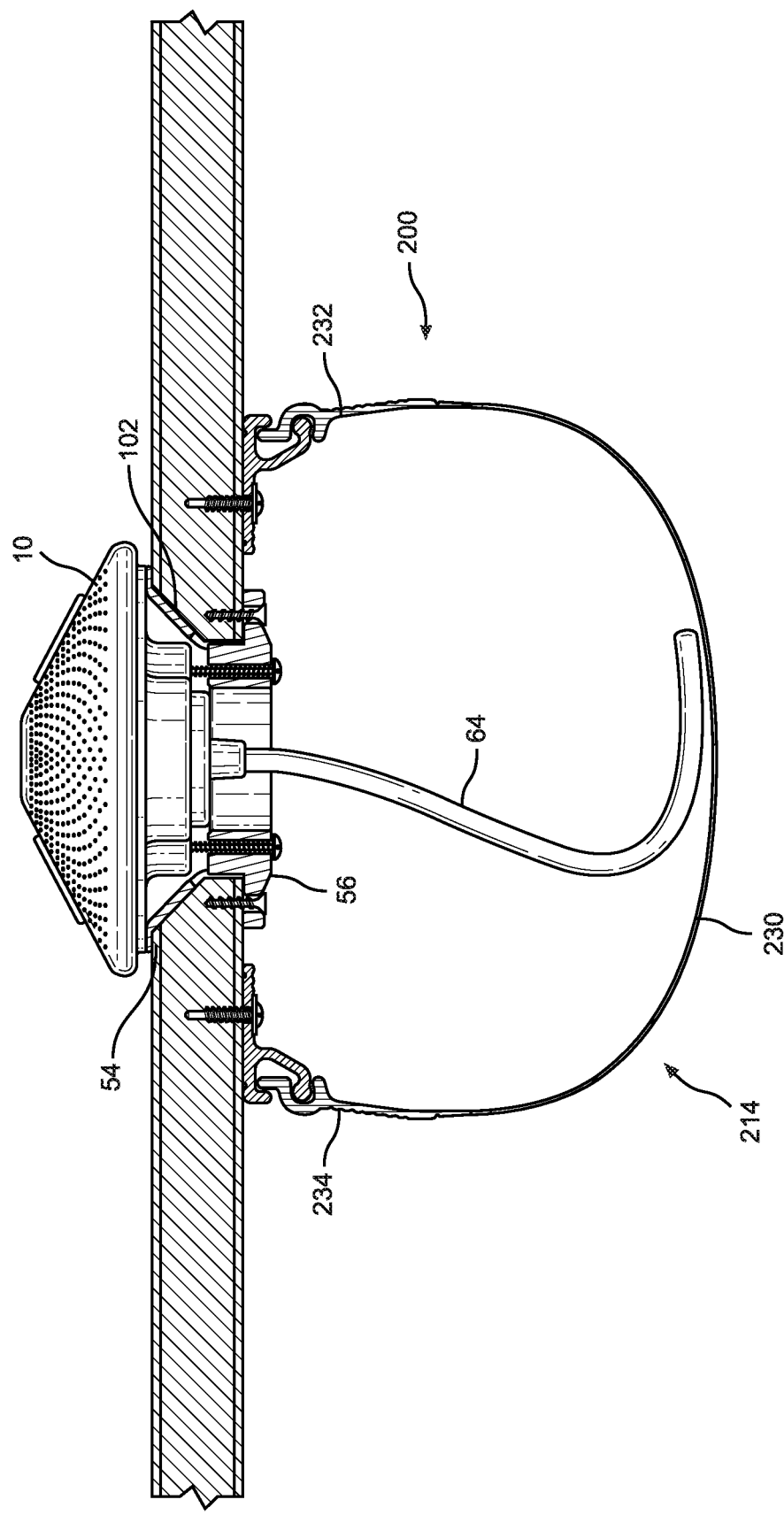
FIG. 22 is a partially sectioned view in side elevation of an integrated power supply system mounted within a work surface with a wire management system.

As best seen, perhaps, in FIGS. 8 and 9, the bracket 56 in the depicted embodiment has inwardly-extending ears for being received into the inlets in the oblong peripheral shape of the central engaging portion 30 and outwardly extending ears for overlying the underside of the work surface 100 adjacent to the aperture 102. The inwardly-extending apertures correspond in number and location to the inlets in the central engaging portion 30. With that, fasteners can be received through the bracket 56 and into the apertures in the base 12 as in FIGS. 22 through 24. Additionally or alternatively, fasteners can be received through the bracket 56 and into the work surface 100 as is also shown in FIG. 22, for instance. According to embodiments of the invention, therefore, an oblong mounting collar 54 can be fixed to line an oblong aperture 102 in the work surface 100, and the base 12 of the system 10 can then be secured within the aperture 102 by a reception of the central engaging portion 30 into the mounting collar 54 and a fixation of the base 12 relative to the mounting collar 54 and the work surface 100. The mounting bracket 56 is thus secured to the base 12 with the mounting collar 54 and the work surface 100 disposed therebetween.

Figure 7:
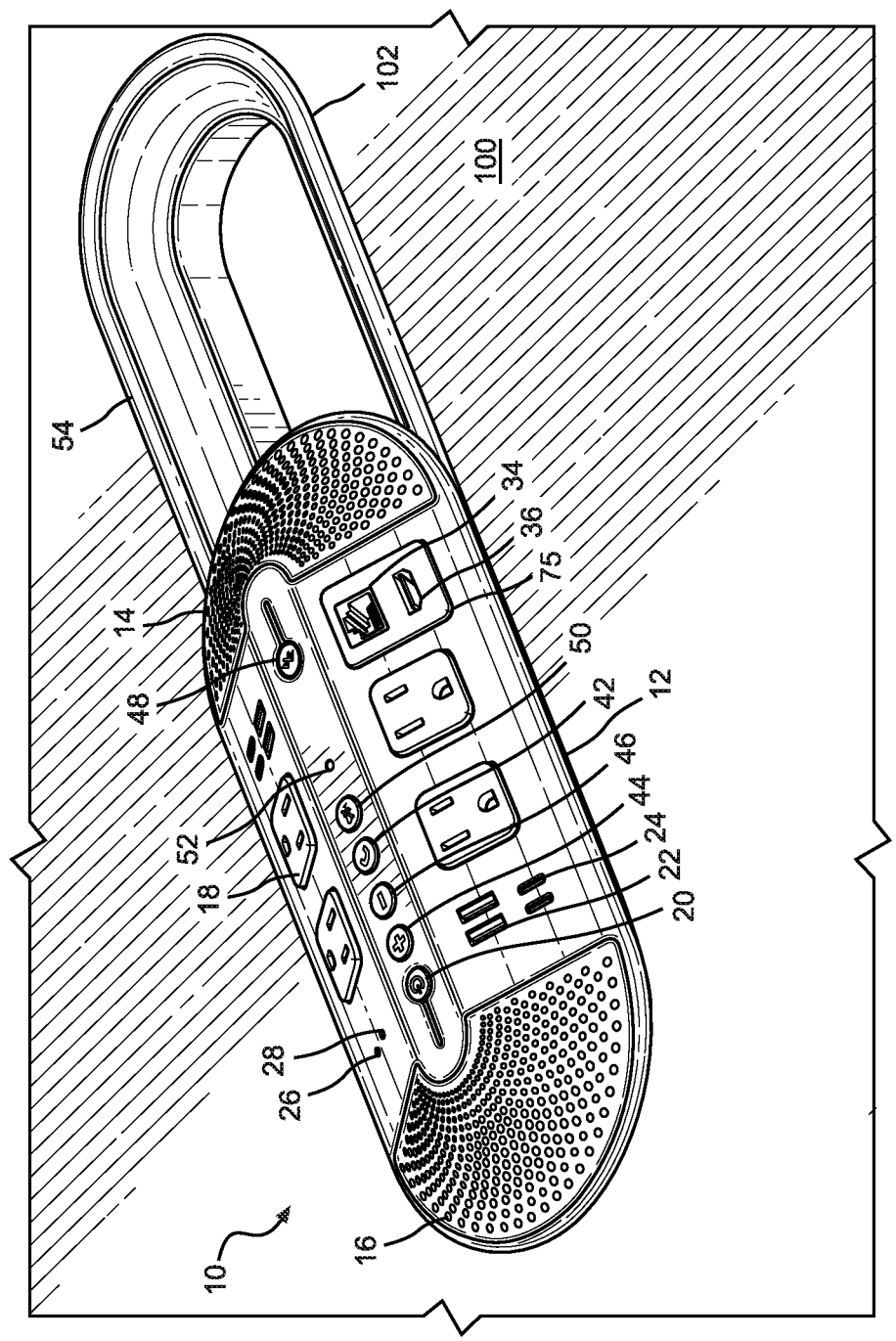
FIG. 7 is a perspective view of an integrated power supply system with audio and electronic connection capabilities mounted within a work surface.
Figure 23:
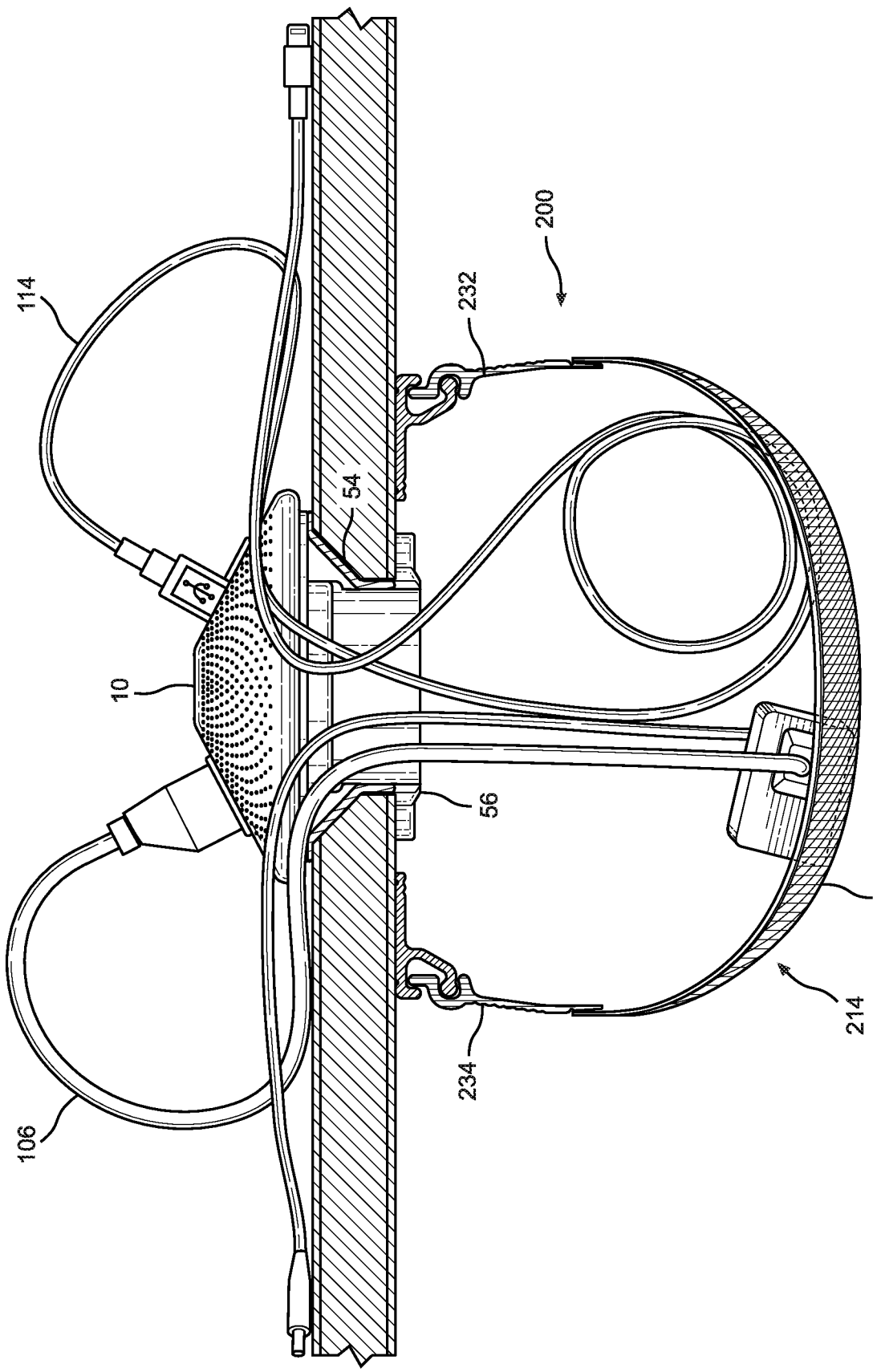
FIG. 23 is a partially sectioned view in side elevation of an integrated power supply system mounted within a work surface with a wire management system depicted in management of electronic wiring.
Figure 24:
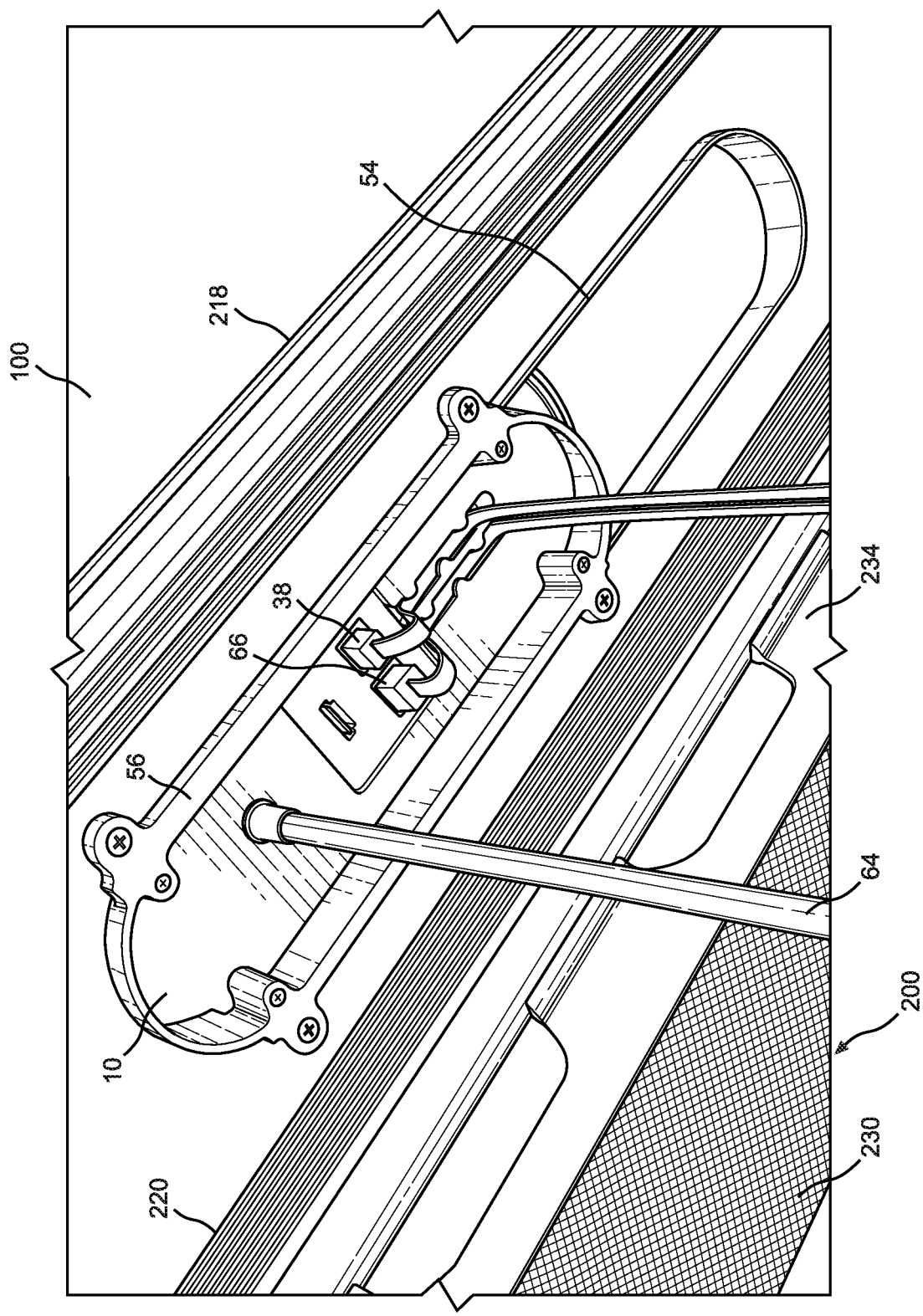
FIG. 24 is a lower perspective view of an integrated power supply system mounted within a work surface with a wire management system.

As FIGS. 22 and 23 illustrate, the mounting collar 54 can have a wall portion with a portion that tapers proximally to distally, and the aperture 102 in the work surface 100 can be chamfered at an angle generally corresponding to the taper of the wall tapered wall portion of the mounting collar 54. The mounting collar 54 can thus be closely received into the aperture 102 in the work surface 100. As shown, for example, in FIGS. 6 and 7, the aperture 102 and the mounting collar 54 can have a longitudinal opening dimension greater than the length of the base 12. As such, the position of the base 12 within the slot aperture 102 can be selectively adjusted, such as to provide adjustable spacing within the slot aperture 102. The base 12 can thus be disposed with spacing to the first or second ends of the base 12 as in FIG. 7 or with spacing to both ends of the base 12 as in FIG. 6.

Figure 12:
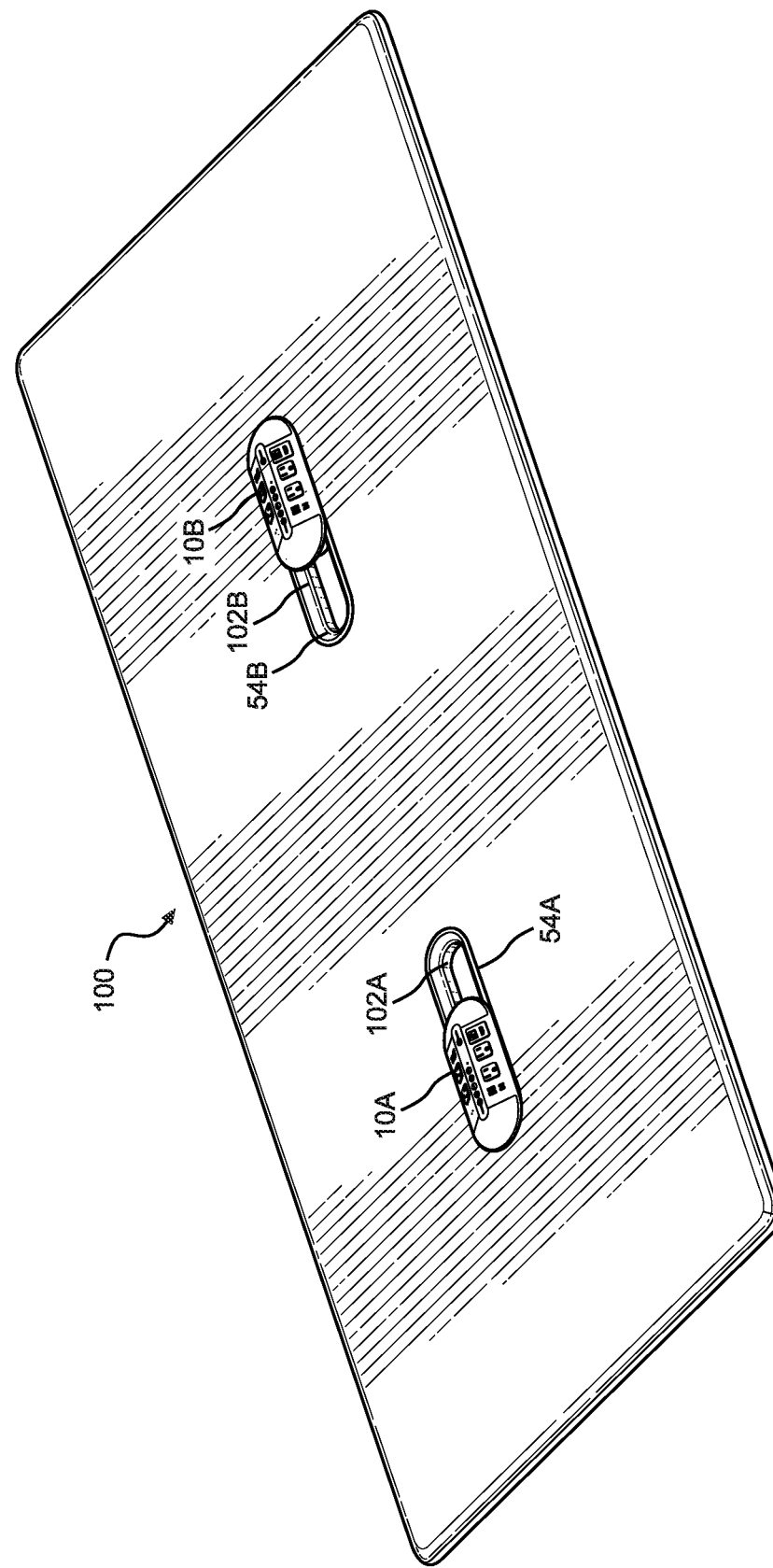
FIG. 12 is a perspective view of first and second integrated power supply systems with audio and electronic connection capabilities mounted within a large work surface.
Figure 13:
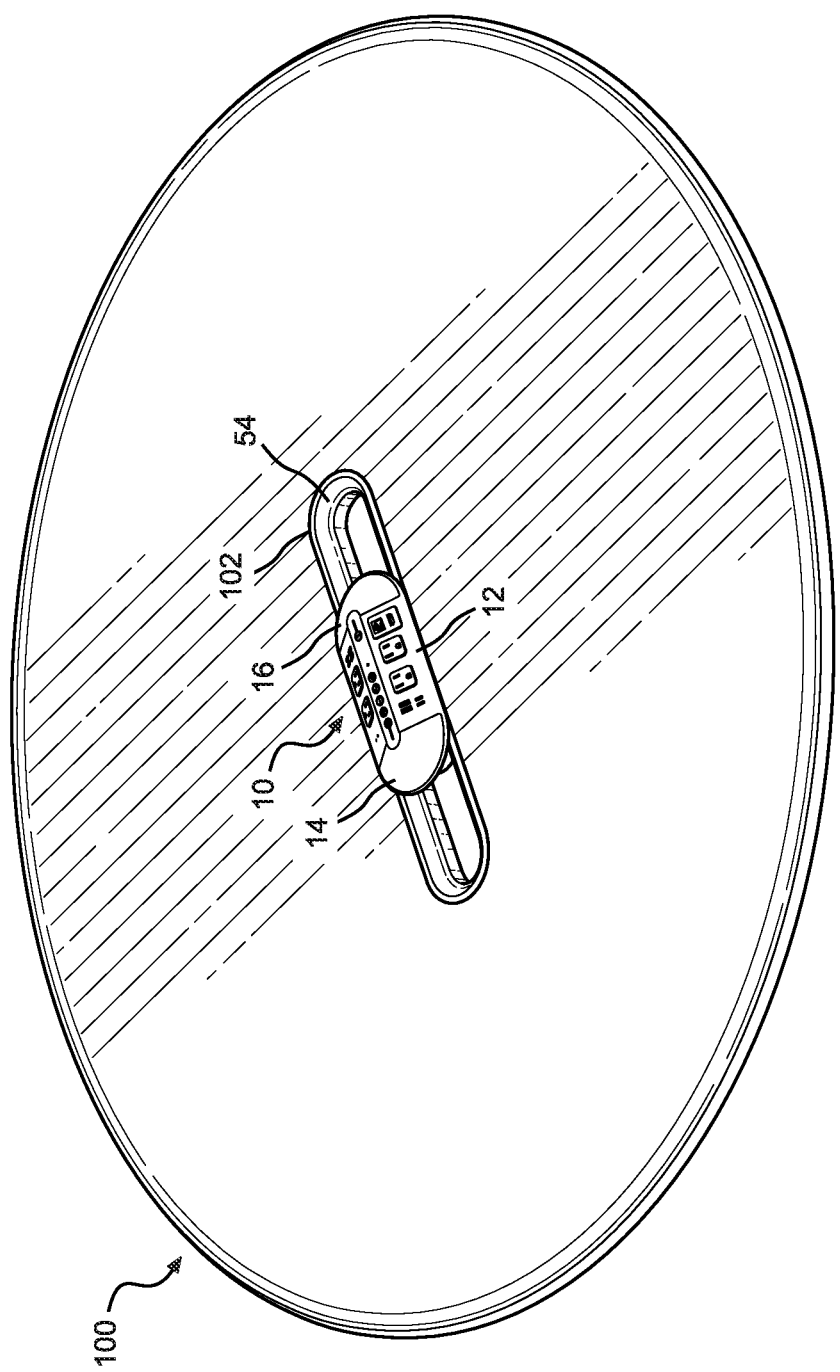
FIG. 13 is a perspective view of an integrated power supply system with audio and electronic connection capabilities mounted within a small work surface.
Figure 14:
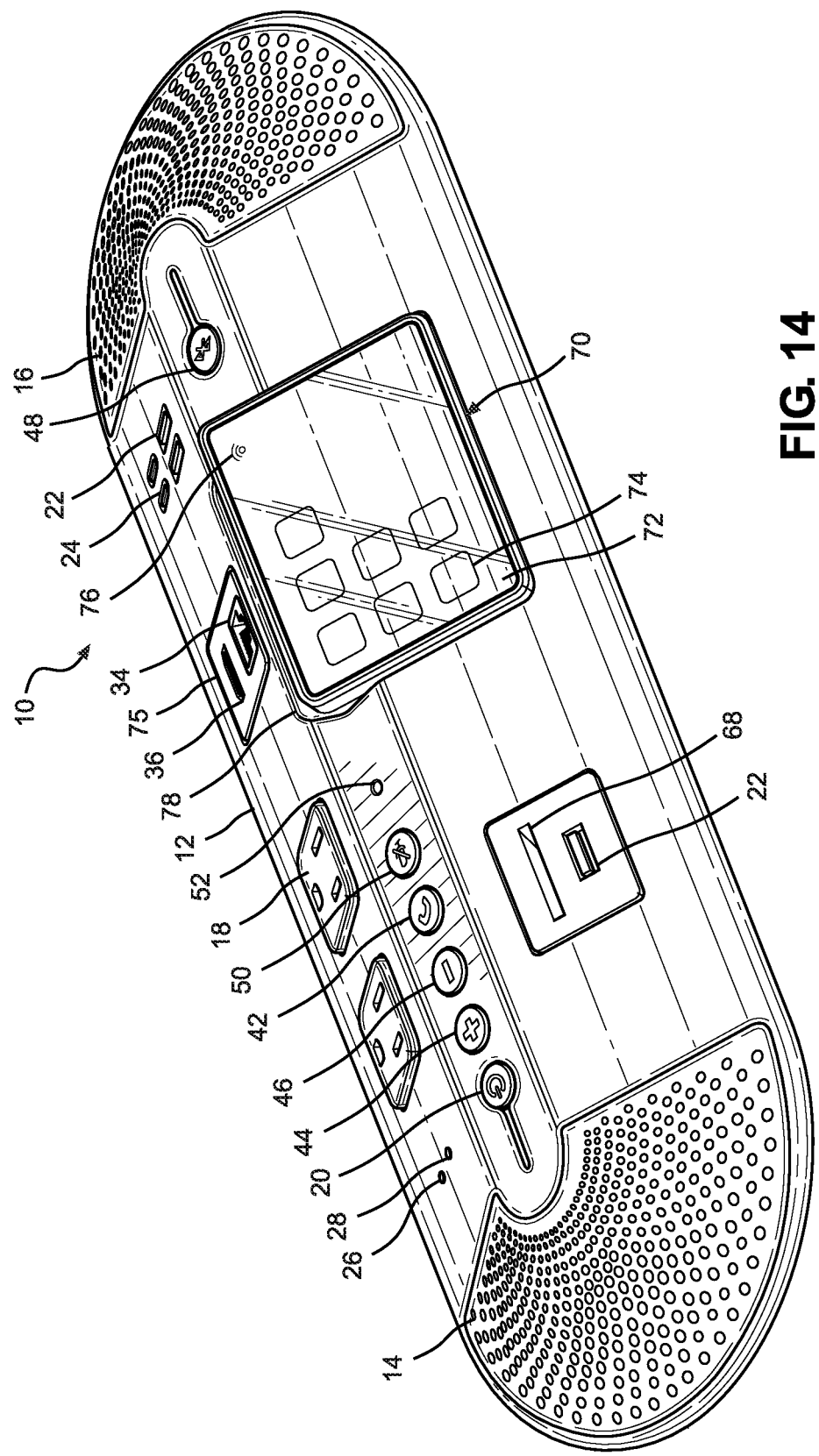
FIG. 14 is a perspective view of an integrated power supply system with audio and electronic connection capabilities and an electronic command console.
Figure 15:
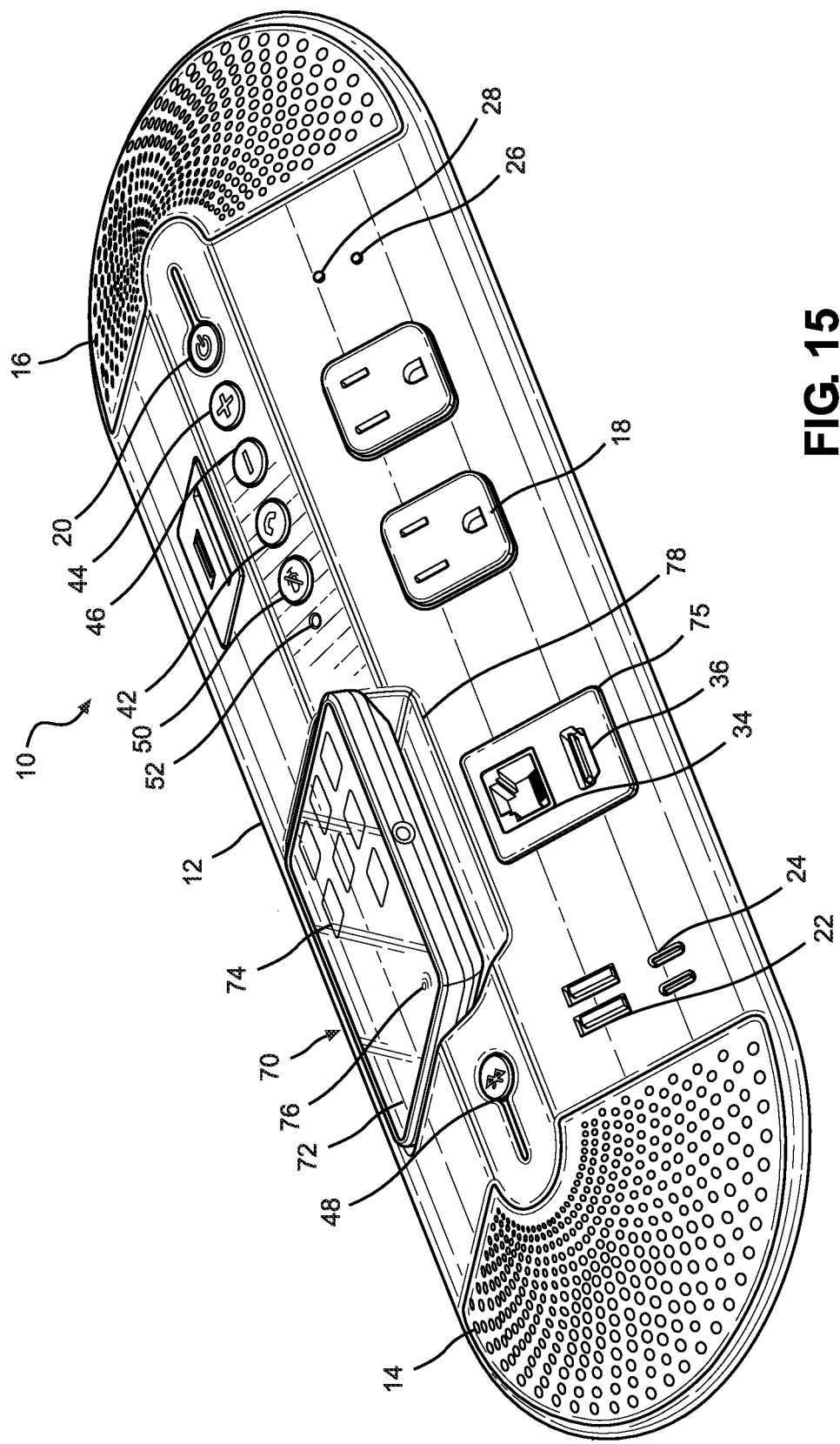
FIG. 15 is a rearward perspective view of the integrated power supply system of FIG. 14.

As shown in FIG. 12, a given work surface 100 could retain plural integrated power supply systems 10A, 10B, $10n$ within a corresponding plurality of apertures 102A, 102B, $102n$. In each instance, although other dispositions are possible and within the scope of the invention, the integrated power supply systems 10A, 10B, $10n$ can be disposed along a longitudinal centerline of the work surface 100. Alternatively, as is shown in relation to a smaller, round work surface 100 in FIG. 13, a single integrated power supply system 10 could be selectively and adjustably retained. It is also within the scope of the invention for a single elongate slot aperture 102 to retain plural systems 10 in an adjustable manner.

The ability to place the base 12 selectively in relation to the mounting collar 54 and within the slot aperture 102 provides a number of benefits. For instance, selective spacing can permit placing of the base 12 in greater proximity to a given location along the work surface 100. Selective adjustment of the base 12 in relation to the slot aperture 102 can also permit spacing for wire management, such as to permit the passage of power and data cords and the like.

An integrated power supply system 10 with still greater capabilities is shown in FIGS. 14 through 18. There, the integrated power supply system 10 again has an oblong base 12 with a raised, elongate central portion and first and second end portions. First and second half frusto-conical speakers 14 and 16, which are built into the first and second end portions of the base 12, act as audio outputs for the integrated power supply system 10. Power and data connections are retained by the central portion of the base 12, again including grounded power outlets 18 and power and data connectivity ports comprising universal serial bus (USB) ports 22 and universal serial bus Type C (USB-C) ports 24. A local area network (LAN) port 34 and a high-definition multimedia interface (HDMI) port 36 are disposed within the central portion and corresponding LAN and HDMI ports 38 and 40 are disposed in the lower surface of the base 12 for providing external connectivity. Still further, a memory card slot 68 is provided in the base 12 to receive and electronically connect with a memory card that can retain data, software applications, or other electronic items in electronic memory. A power button 20 within the plateau of the base 12 selectively powers one or more aspects of the integrated power supply system 10.

Figure 16:
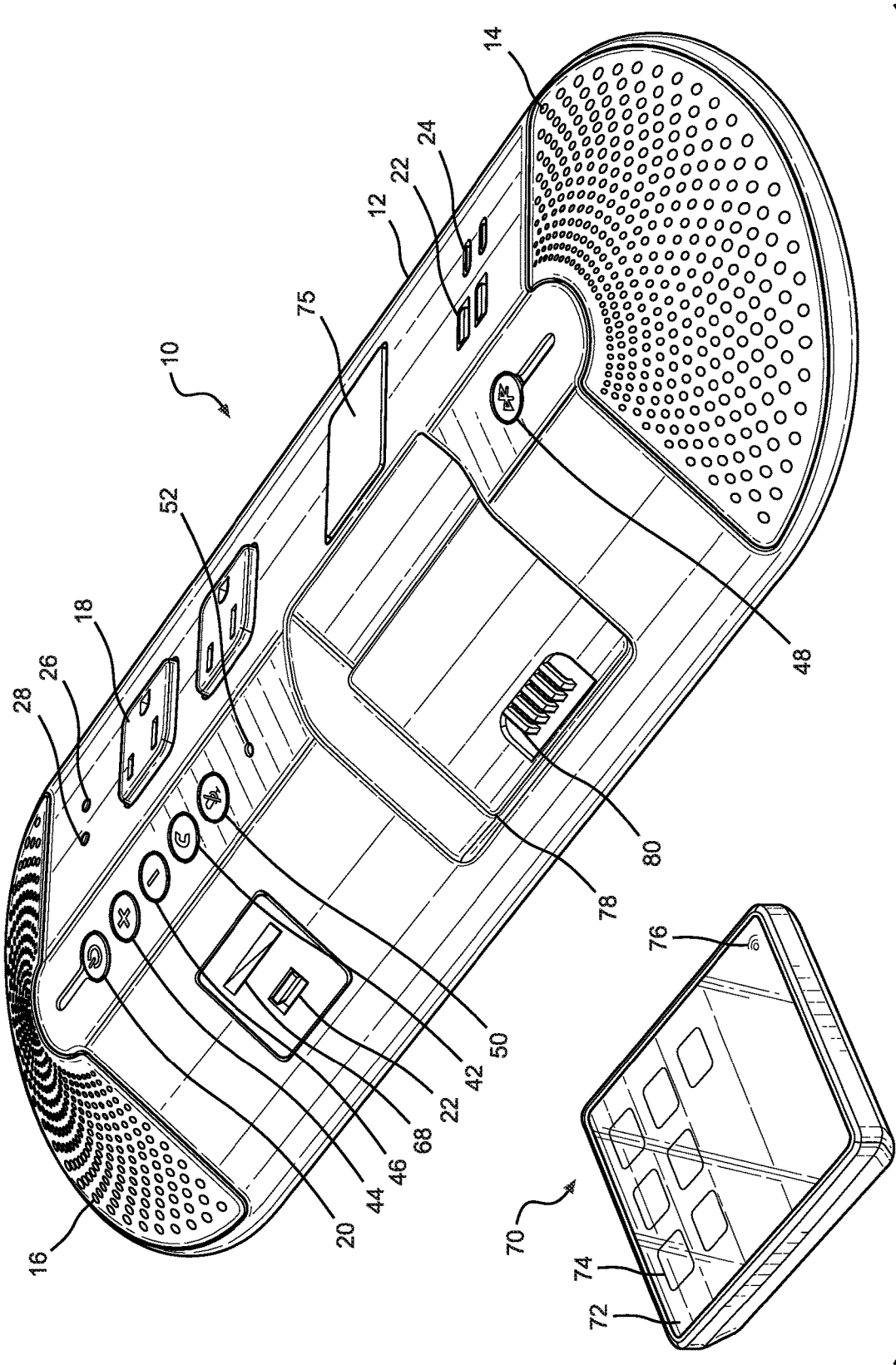
FIG. 16 is a perspective view of the integrated power supply system of FIG. 14 with the command console detached from the base.
Figure 17:
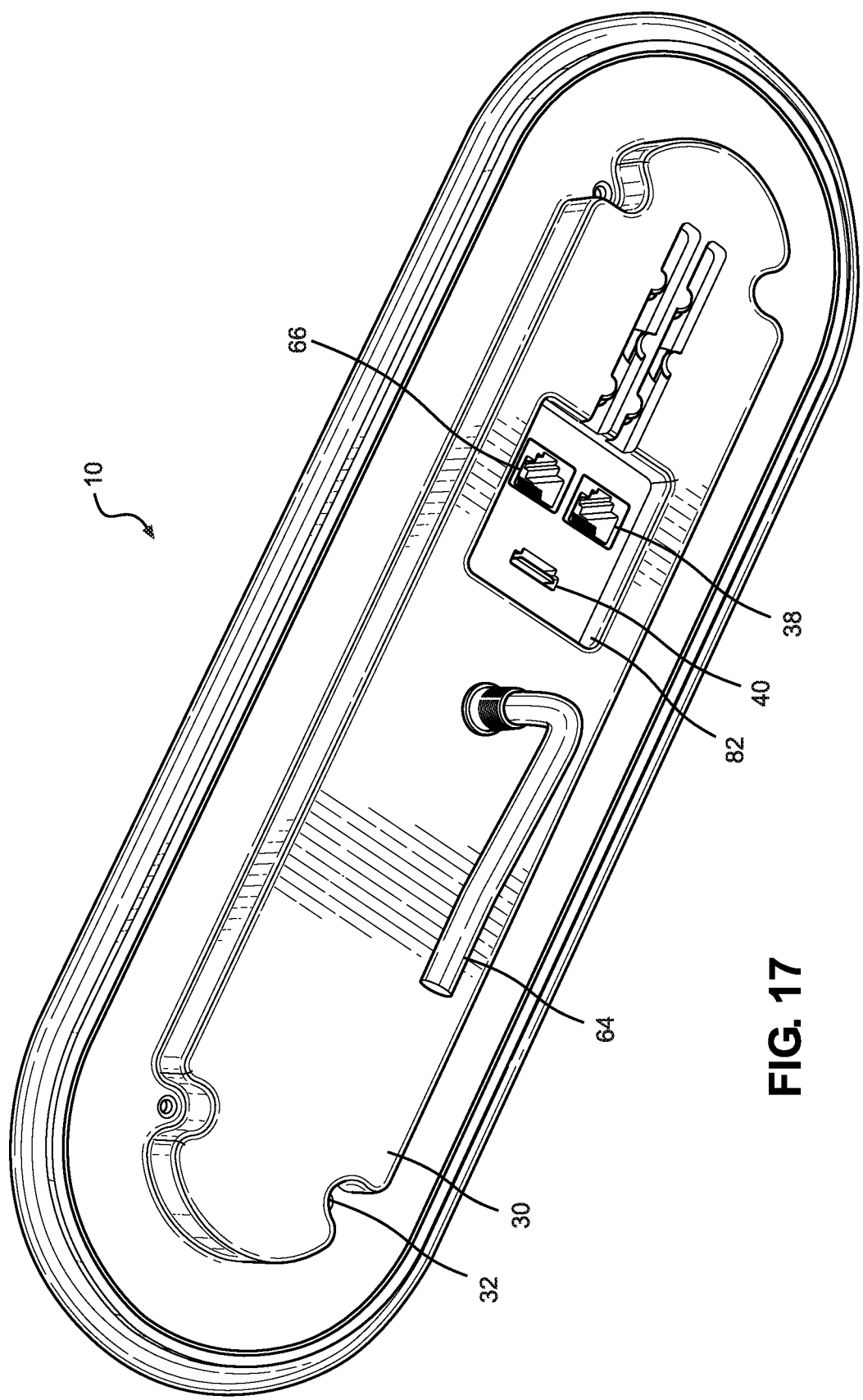
FIG. 17 is a lower perspective view of the integrated power supply system of FIG. 14.
Figure 18:
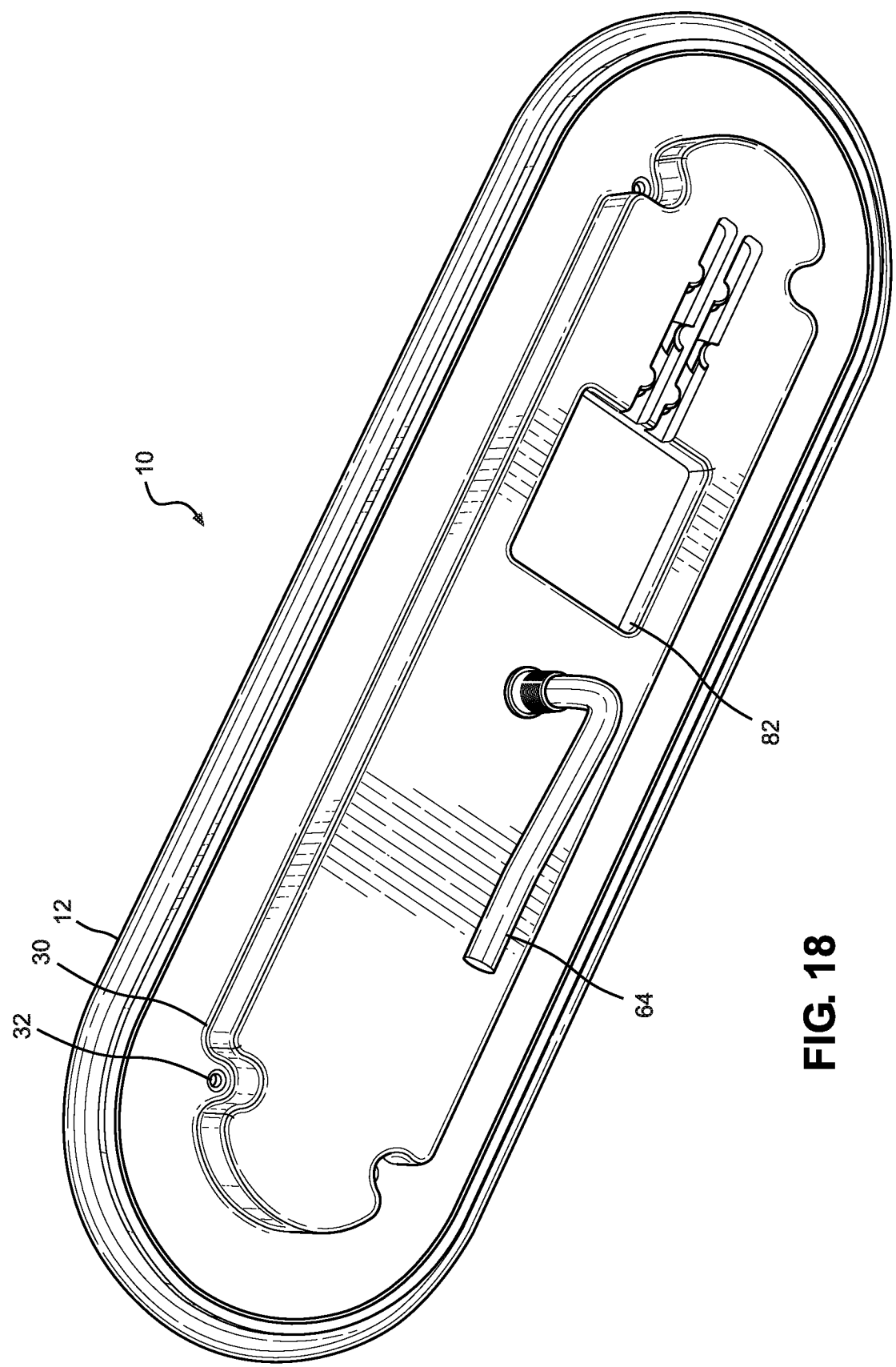
FIG. 18 is a lower perspective view of an alternative integrated power supply system.

As can be understood with combined reference to FIGS. 14 through 18, the base 12 in each of the embodiments disclosed herein can incorporate what can be referred to as an option window 75 that can be selectively employed to retain connectivity ports. In certain embodiments, as in FIG. 16, the option window 75 can be provided as a blank plate without functionality. Alternatively, as in FIGS. 14 and 15, for example, the option window 75 can be employed to retain local area network (LAN) and high-definition multimedia (HDMI) ports 34 and 36. In a similar manner, as FIGS. 17 and 18 show, an option bay 82 can be provided on the underside of the base 12 so that, where appropriate based on the options on the user-facing surface of the base 12, local area network (LAN) and high-definition multimedia (HDMI) ports 38 and 40 and a telephone line port 66 can be provided for connection external to the base 12.

As taught herein, wireless connectivity can be provided through the integrated power supply system 10 by operation of a wireless connectivity button 48 disposed within the plateau of the central portion. Telephone connectivity, including via speakerphone, is controlled by a telephone connection button 42, a telephone disconnection or muting button 50, and volume increase and decrease buttons 44 and 46 in cooperation with a microphone port 52 in the base 12. Again, electronic circuitry and electrical wiring for each of the described components is housed partially or completely within the base 12.

The embodiment of the integrated power supply system 10 of FIGS. 14 through 18 further incorporates a detachable electronic command console 70. The electronic command console 70 is operable to control the operation of the base 12 and the system 10 in general. The command console 70 has an electronic display screen 72 for operating as a graphic user interface with plural user interface controls 74 that can control not only the wired and wireless connectivity described hereinabove but also presentation, telephone and video conferencing, local and remote communications, and other electronic power and data operations of the system 10. The user interface controls 74 can be fixed in character, or they can be variable, such as through a menu or other control function. One or more display or status icons 76, such as power, connectivity, and time icons 76, can be displayed on the display screen 72 for indicating relevant status conditions, including general status conditions and those particular to the command console 70.

As shown in FIG. 16, the command console 70 is detachable from the main base 12 of the integrated power supply system 10. When detached from the base 12, the command console 70 can communicate wirelessly, such as through the protocol offered under the registered trademark BLUETOOTH or otherwise, with the base 12 and with other electronic devices, including through electronic communication with the base 12 and potentially directly with the other electronic devices. When received within a corresponding reception bay 78 in the base 12, the command console 70 can receive power, such as for recharging of an internal power supply, and the command console 70 can electronically connect with the base 12 to provide command and control functions by direct electrical connection via electrical contacts 80 disposed in the reception bay 78 and on the command console 70.

The command console 70 can thus operate as a handheld, portable control unit. One using the command console 70 can execute a number of tasks, including managing presentations displayed on a monitor or projector connected by wire or wirelessly to the integrated power supply system 10. The display screen 72 of the command console 70 can enable the display, control, and operation of computer applications retained in electronic memory, whether in the command console 70, in the base 12, in a connected electronic device, by remote communication, or otherwise. Computer applications can be individually opened and operated thereby to allow the appropriate content to be displayed relevant to managing the operative software application. The command console 70 can permit a person, such as a person making a presentation, to use the command console 70 as a pointing device, an underlining device, or another input device, including for text and graphics displayed on, for example, a projection screen, a video display screen, or another user interface to maximize presentation abilities.

The display screen 72 of the command console 70 can further enable the display and operation of alphanumeric buttons as the interface controls 74 to permit control and operation of the integrated power supply system 10 as a fully-operational telephone system. Stated alternatively, as disclosed herein, the display screen 72 can be operative as a telephone keypad to permit the placement and control of telephone calls and other communications using the telephone and other connectivity of the integrated power supply system 10 with audio and electronic communication and connection capabilities.

With additional reference to FIGS. 19 through 24, further wire management can be achieved below the work surface 100 by use of a wire management system 200, such as that disclosed by the present inventor's application Ser. No. 16/874,545, filed May 14, 2020, for Wire Management Systems and Methods, which is incorporated herein by reference. Particularly when used in combination with the present integrated power supply system 10, the wire management system 200 provides enhanced capabilities for below-work surface support and storage for power and communication wires, cables, and accessories.

Figure 19:
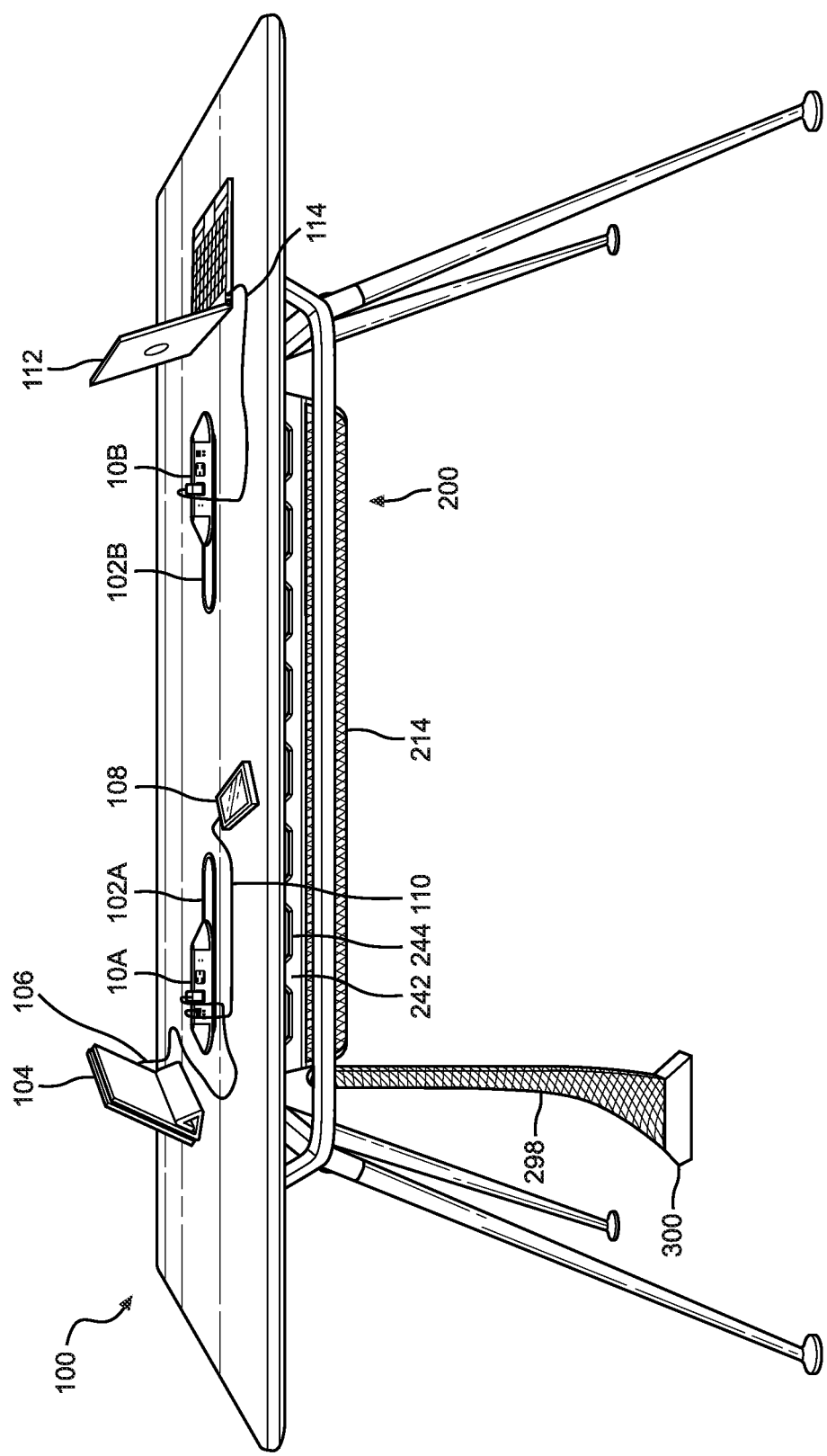
FIG. 19 is a perspective view of first and second integrated power supply system mounted in relation to a work surface with a wire management system applied in support of wiring for plural electronic devices.
Figure 20:
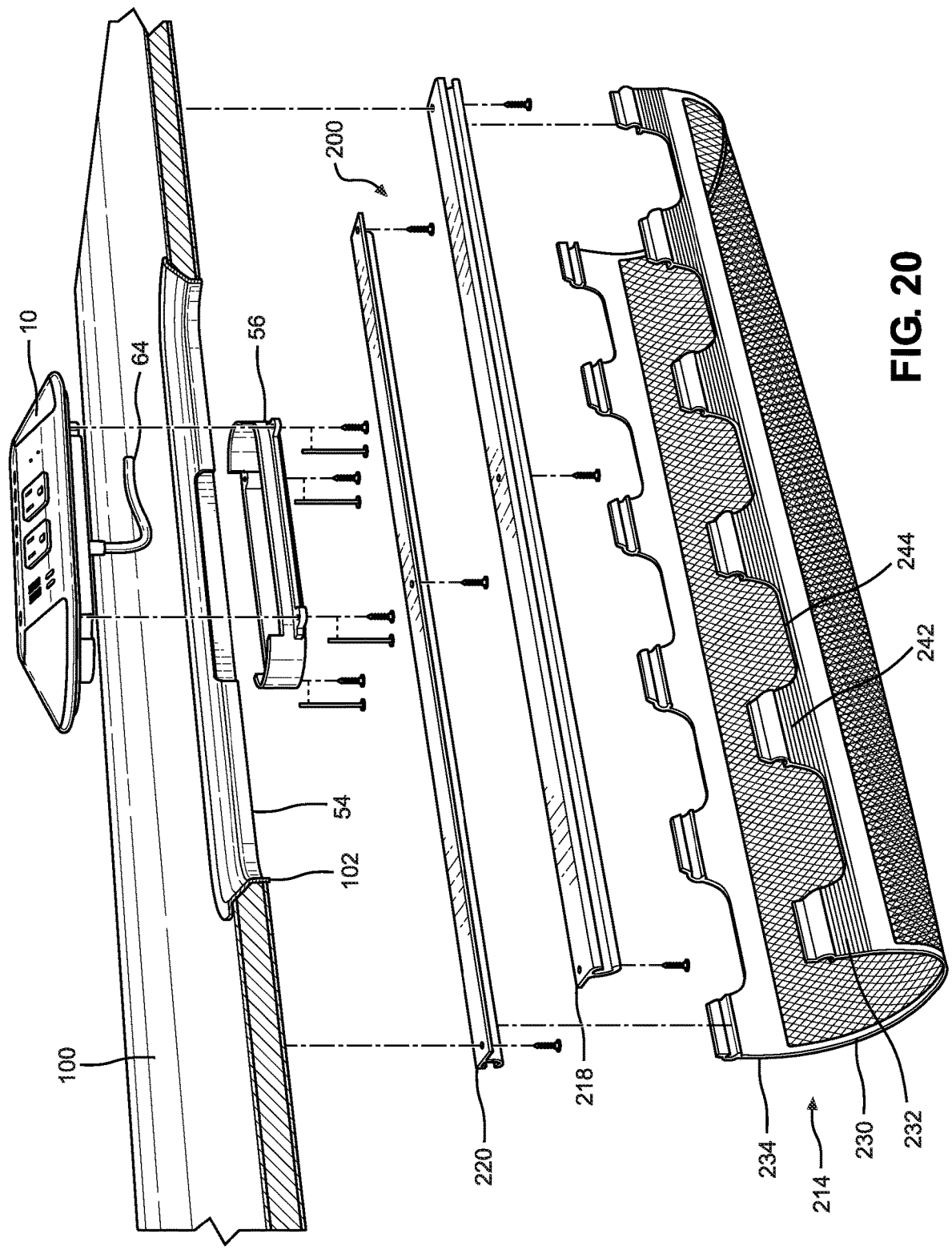
FIG. 20 is an exploded perspective view of an integrated power supply system depicted in relation to a work surface and a wire management system.
Figure 21:
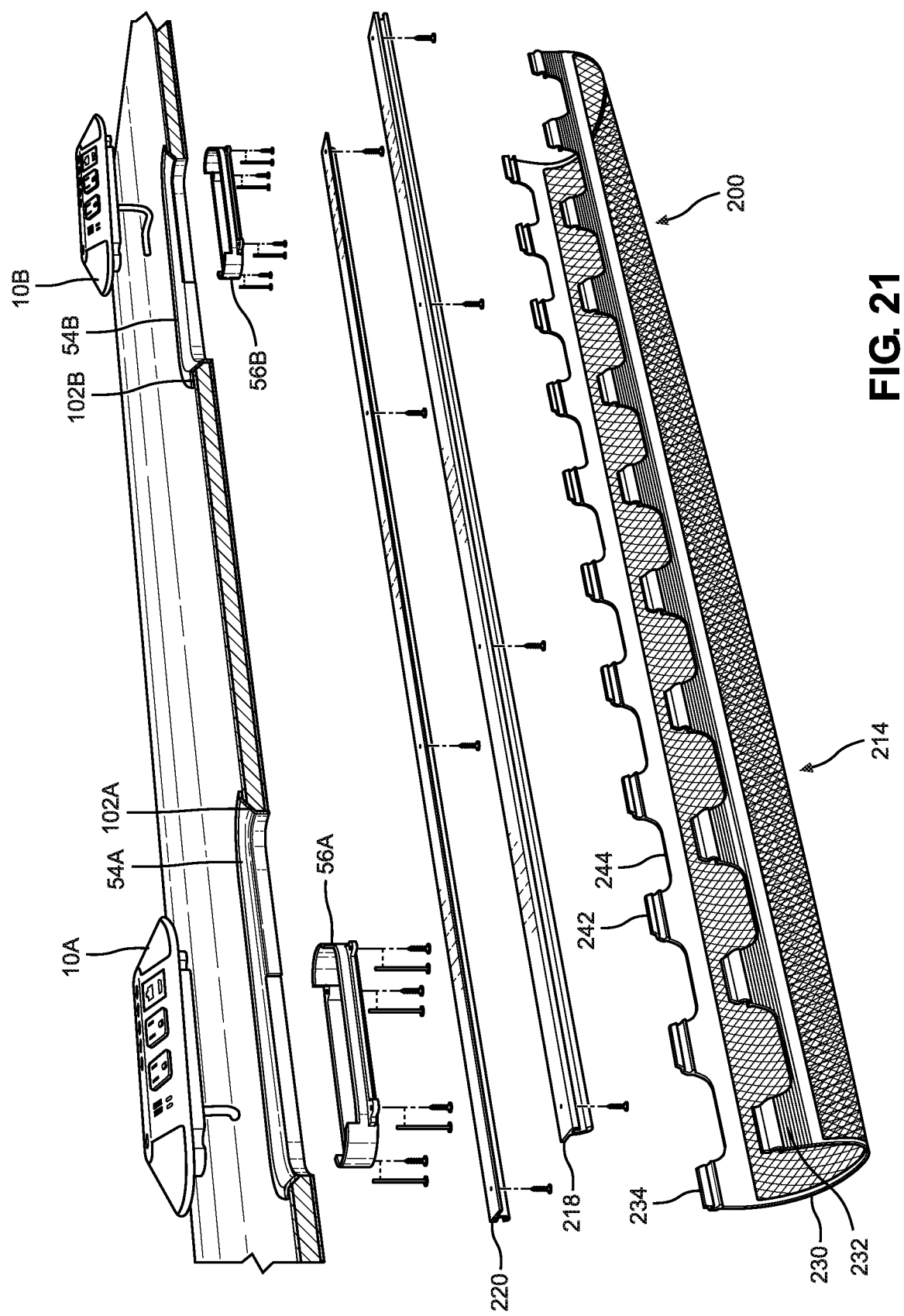
FIG. 21 is an exploded perspective view of first and second integrated power supply systems depicted in relation to a work surface and a wire management system.

In FIGS. 19 and 21, for example, first and second integrated power supply systems 10A and 10B are adjustably received within first and second elongate slots 102A and 102B in the work surface 100. In a display of the utility of the integrated power supply systems 10 disclosed herein, the first system 10A is electrically connected by a cable 106 to a first electronic device 104, which comprises a tablet computer 104. The cable 106 can be operative to provide power and data connectivity between the tablet computer 104 and the system 10A. A second electronic device 108, which in this example comprises a smart phone 108, is similarly connected to the first integrated power supply system 10A by a cable 110 that can provide power and data connectivity between the smart phone 108 and the system 10A. Still further, a third electronic device 112 comprising a laptop computer 112 is electrically connected for power and, additionally or alternatively, data connectivity by a cable 114 to the second integrated power supply system 10B. Also as disclosed herein, it would be possible for one or more of the cables 106, 110, and 114 or other wiring connections to bypass the integrated power supplies 10A and 10B and to pass directly through an aperture 102A or 102B in the work surface 100 for wire management and connection below the work surface 100.

In any case, by use of the integrated power supply systems 10A, 10B, 10n and the aperture 102A, 102B, 102n provided therefor, the plural electronic devices 104, 108, and 112 can thus be provided with readily available, effective power and data connectivity without a nest of wires crowding the valuable work surface 100. Below the work surface 100, as FIGS. 22 and 23 show, the power and data cabling 64 exiting the integrated power supply system 10 and wiring 106 and 115 connecting electronic devices 104, 108, and 112 themselves can be cradled, organized, and otherwise managed by the wire management system 200. As in FIG. 24, power and data cabling 64, LAN cables 38, telephone cables 66, and other wiring can be disposed and retained below the work surface 100.

As is further described in copending application Ser. No. 16/874,545, the wire management system 200 can, in certain embodiments, have a flexible cradle 214, which can comprise or incorporate a mesh material, that is supported to span below the work surface 100 by first and second elongate rails 218 and 220 that are mounted to the work surface 100. In the depicted embodiment, the flexible cradle 214 comprises a central, elongate mesh portion 230 that is joined along longitudinal edges with first and second attachment sections 232 and 234. The first and second attachment sections 232 and 234 are selectively and removably coupled to the first and second elongate rails 218 and 220 by a spline engagement, and the first and second attachment sections 232 and 234 are crenelated to have spline segments 242 separated by spline apertures 244. Together, the spline segments 242 and the spline apertures 234 permit adjustable attachment of the flexible cradle 214 while also enabling the interstitial passage of wiring through the apertures 234. Wiring exiting the cradle 214 of the wire management system 200 can pass within a cable sleeve 298, such as to a floor connection 300 for power and data connectivity.

Making use of an embodiment of the integrated power supply system 10, a user can thus be simultaneously provided with accessible power for computers, mobile telephones, tablets, and other electronic devices while also enjoying audio capabilities provided by the integrated speakers 14 and 16 and the electronic communication and connection capabilities provided, for instance, by the universal serial bus (USB) ports 22, by the universal serial bus type C (USB-C) ports 24, by the local area network (LAN) port 34, and by the high-definition multimedia interface (HDMI) port 36. Rather than a roomful of individuals huddling around the weak speaker of a mobile phone or laptop, full, powerful audio capabilities are provided by presently disclosed system 10 through the speakers 14 and 16.

The system 10 can be connected by wire or wirelessly to mobile telephones, laptops, tablets, and other electronic devices, and electronic wiring can be readily routed through the aperture or apertures 102 disposed in a work surface 100. Moreover, where incorporated into the system 10, the microphone 52 and speakers 14 and 16 can be employed for telephone and online conferencing to provide reliable and robust communication capabilities. Still further, the command console 70 can enable handheld, plenary control over the integrated power supply system 10 as a presentation, communication, connectivity, and power supply station. By providing an integrated power supply with audio and electronic communication and connection capabilities, the system 10 can be mounted in relation to a work surface 100 to enable convenient, enhanced access to electrical power and audio and electronic communications and connections in office, academic, and home environments. Electronic wiring can be passed through the work surface 100 with extra wiring stored beneath the work surface 100 to enable the surface 100 to be open and unobstructed.

With certain details and embodiments of the present invention for an integrated power supply system 10 with audio and electronic communication and connection capabilities disclosed, it will be appreciated by one skilled in the art that changes and additions could be made thereto without deviating from the spirit or scope of the invention. This is particularly true when one bears in mind that the presently preferred embodiments merely exemplify the broader invention revealed herein. Accordingly, it will be clear that those with certain major features of the invention in mind could craft embodiments that incorporate those major features while not incorporating all of the features included in the preferred embodiments.

Therefore, the following claims shall define the scope of protection to be afforded to the inventor. Those claims shall be deemed to include equivalent constructions insofar as they do not depart from the spirit and scope of the invention. It must be further noted that a plurality of the following claims may express, or be interpreted to express, certain elements as means for performing a specific function, at times without the recital of structure or material. As the law demands, any such claims shall be construed to cover not only the corresponding structure and material expressly described in this specification but also all legally-cognizable equivalents thereof

I claim:

1. An integrated power supply system with audio and electronic communication and connection capabilities for being retained by a work surface, the integrated power supply system comprising:
   a system base;
   at least one power outlet retained by the system base;
   at least one electronic data connectivity port retained by the system base;
   at least one speaker retained by the system base;
   wherein the system base further comprises an electronic telephone connectivity subsystem comprising electronic telephone circuitry, a telephone control interface, and a microphone interface wherein the telephone control interface comprises a telephone connection button, a telephone disconnection or muting button, and volume increase and decrease buttons disposed in the system base; and
   wherein the system base further comprises a wireless connectivity subsystem with a wireless connectivity button disposed within the system base.

2. The integrated power supply system of claim 1, wherein the system base has a central portion and first and second end portions and wherein a first speaker is built into the first end portion of the system base and a second speaker is built into the second end portion of the system base.

3. The integrated power supply system of claim 1, wherein the at least one electronic data connectivity port comprises a universal serial bus (USB) port.

4. The integrated power supply system of claim 3, wherein the at least one electronic data connectivity port further comprises a universal serial bus type C (USB-C) port.

5. The integrated power supply system of claim 1, wherein the at least one electronic data connectivity port comprises a local area network (LAN) port.

6. The integrated power supply system of claim 1, wherein the at least one electronic data connectivity port comprises a high-definition multimedia interface (HDMI) port.

7. The integrated power supply system of claim 1, wherein the system base has a main body portion with an upper surface and a lower surface and wherein the system base has a central engaging portion that projects distally from the lower surface of the main body portion for being received into positive engagement with an aperture in the work surface.

8. The integrated power supply system of claim 7, further comprising a mounting bracket for retaining the system base in relation to an aperture in the work surface wherein the mounting bracket is adapted to be disposed to an underside of the work surface to be secured to the system base thereby to secure the work surface between the system base and the mounting bracket.

9. The integrated power supply system of claim 8, wherein the mounting bracket has an opening sized and shaped to receive the central engaging portion of the system base.

10. The integrated power supply system of claim 1, further comprising a mounting collar and a mounting bracket for retaining the system base in relation to an aperture in the work surface wherein the mounting bracket is adapted to be received from an underside of the work surface to be secured to the system base to clamp the work surface between the system base and the mounting bracket.

11. The integrated power supply system of claim 1, further comprising a memory card slot in the system base to receive and electronically connect with a memory card.

12. The integrated power supply system of claim 1, further comprising a work surface with an aperture therein for receiving and retaining the system base.

13. The integrated power supply system of claim 12, further comprising a mounting bracket for retaining the system base in relation to the aperture in the work surface wherein the mounting bracket is adapted to be received from an underside of the work surface to be secured to the system base to secure the work surface between the system base and the mounting bracket.

14. The integrated power supply system of claim 13, wherein the system base has a main body portion with an upper surface and a lower surface and wherein the system base has a central engaging portion that projects distally from the lower surface of the main body portion for being received into positively engagement with the aperture in the work surface.

15. The integrated power supply system of claim 14, wherein the mounting bracket has an opening sized and shaped to receive the central engaging portion of the system base.

16. An integrated power supply system with audio and electronic communication and connection capabilities for being retained by a work surface, the integrated power supply system comprising:
a system base;
at least one power outlet retained by the system base;
at least one electronic data connectivity port retained by the system base;
at least one speaker retained by the system base;
a mounting collar and a mounting bracket for retaining the system base in relation to an aperture in the work surface wherein the mounting bracket is adapted to be received from an underside of the work surface to be secured to the system base to clamp the work surface between the system base and the mounting bracket, wherein the system base has a longitudinal length, wherein the mounting collar has a longitudinal opening with a length, and wherein the length of the longitudinal opening of the mounting collar is greater than the longitudinal length of the system base whereby the system base can be selectively positioned within the mounting collar.

17. An integrated power supply system with audio and electronic communication and connection capabilities for being retained by a work surface, the integrated power supply system comprising:
a system base;
at least one power outlet retained by the system base;
at least one electronic data connectivity port retained by the system base; and
at least one speaker retained by the system base;
wherein the system base has an upper surface and a lower surface and further comprising an option window in the upper surface of the system base and an option bay in the lower surface of the system base wherein the option window and the option bay can be selectively employed to retain corresponding electronic data connectivity ports.

18. The integrated power supply system of claim 17, wherein the option window and the option bay are selectively removable and replaceable in relation to the system base.

19. An integrated power supply system with audio and electronic communication and connection capabilities for being retained by a work surface, the integrated power supply system comprising:
a system base wherein the system base has a main body portion with an upper surface and a lower surface and wherein the system base has a central engaging portion that projects distally from the lower surface of the main body portion for being received into positive engagement with an aperture in the work surface;
at least one power outlet retained by the system base;
at least one electronic data connectivity port retained by the system base;
at least one speaker retained by the system base;
a mounting bracket for retaining the system base in relation to the aperture in the work surface wherein the mounting bracket is adapted to be disposed to an underside of the work surface to be secured to the system base thereby to secure the work surface between the system base and the mounting bracket, wherein the mounting bracket has an opening sized and shaped to receive the central engaging portion of the system base, and wherein the mounting bracket has inwardly-extending projections for receiving fasteners therethrough and into the system base.

20. The integrated power supply system of claim 19, wherein the mounting bracket has outwardly extending projections for receiving fasteners therethrough and into the work surface.

21. The integrated power supply system of claim 19, further comprising a mounting collar for lining the aperture in the work surface wherein the mounting collar has an opening with a width and a length and wherein the mounting bracket has a width sized to be received into the mounting collar.

22. The integrated power supply system of claim 19, further comprising an electronic command console operative to control electronic operation of the system base wherein the command console is detachable from the system base, wherein the command console retains electronic memory, wherein the command console has an electronic display screen, and wherein the command console is wirelessly connected to the system base electronically whereby the command console is operative as a handheld, portable control unit to provide wireless control over operation of the system base.

23. The integrated power supply system of claim 22, wherein the command console is further operative to provide wireless control over operation of electronic devices connected to the system base.

24. The integrated power supply system of claim 22, further comprising a reception bay in the system base for receiving and selectively retaining the command console wherein the reception bay has electrical contacts that provide an electronic connection between the system base and the command console.

25. The integrated power supply system of claim 22, wherein the system base further comprises an electronic telephonic connectivity subsystem and wherein the command console is operative to provide display and operation of alphanumeric buttons as interface controls operative to permit control and operation of the electronic telephone connectivity subsystem of the integrated power supply system.

26. An integrated power supply system with audio and electronic communication and connection capabilities for being retained by a work surface, the integrated power supply system comprising:

a system base;
at least one power outlet retained by the system base;
at least one electronic data connectivity port retained by the system base;
at least one speaker retained by the system base;
a work surface with an aperture therein for receiving and retaining the system base;
a mounting bracket for retaining the system base in relation to the aperture in the work surface wherein the mounting bracket is adapted to be received from an underside of the work surface to be secured to the system base to secure the work surface between the system base and the mounting bracket; and
a mounting collar that lines the aperture in the work surface.

27. The integrated power supply system of claim 26, wherein the system base has a longitudinal length, wherein the mounting collar has a longitudinal opening with a length, and wherein the length of the longitudinal opening of the mounting collar is greater than the longitudinal length of the system base whereby the system base can be selectively positioned within the mounting collar.

28. The integrated power supply system of claim 27, wherein the mounting bracket has inwardly-extending projections for receiving fasteners therethrough and into the system base.

* * * * *